US008577515B2

(12) United States Patent
Kobayashi et al.

(10) Patent No.: US 8,577,515 B2
(45) Date of Patent: Nov. 5, 2013

(54) VEHICLE DRIVING ASSISTANT AND VEHICLE DRIVING ASSISTING METHOD

(75) Inventors: Masahiro Kobayashi, Ebina (JP); Yasuhisa Hayakawa, Yokohama (JP); Kou Sato, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/384,017

(22) PCT Filed: Jul. 15, 2010

(86) PCT No.: PCT/JP2010/061986
§ 371 (c)(1),
(2), (4) Date: Mar. 15, 2012

(87) PCT Pub. No.: WO2011/007835
PCT Pub. Date: Jan. 20, 2011

(65) Prior Publication Data
US 2012/0166017 A1 Jun. 28, 2012

(30) Foreign Application Priority Data

Jul. 15, 2009 (JP) ................................. P2009-167049
Dec. 24, 2009 (JP) ................................. P2009-292704
Jun. 14, 2010 (JP) ................................. P2010-135077

(51) Int. Cl.
*G05D 1/00* (2006.01)
*G05D 3/00* (2006.01)
*G06F 7/00* (2006.01)
*G06F 17/00* (2006.01)

(52) U.S. Cl.
USPC .............................................................. 701/1

(58) Field of Classification Search
USPC .............................................................. 701/1
See application file for complete search history.

(56) References Cited

U.S. PATENT DOCUMENTS

| 5,761,630 | A | * | 6/1998 | Sekine et al. ................. 701/301 |
| 6,853,884 | B2 | * | 2/2005 | Sadano ............................. 701/1 |
| 7,346,453 | B2 | | 3/2008 | Matsuoka |
| 2003/0014162 | A1 | * | 1/2003 | Sadano ............................. 701/1 |

FOREIGN PATENT DOCUMENTS

| JP | 8-253160 | A | 10/1996 |
| JP | 9-188206 | A | 7/1997 |
| JP | 9-240397 | A | 9/1997 |
| JP | 9-249149 | A | 9/1997 |
| JP | 2003-276543 | A | 10/2003 |
| JP | 2005-319827 | A | 11/2005 |
| JP | 2009-102001 | A | 5/2009 |
| JP | 2009-137385 | A | 6/2009 |
| RU | 2310922 | C2 | 11/2007 |
| RU | 2335805 | C1 | 10/2008 |

\* cited by examiner

*Primary Examiner* — Mary Cheung
*Assistant Examiner* — Frederick Brushaber
(74) *Attorney, Agent, or Firm* — Foley & Lardner LLP

(57) ABSTRACT

A driving assisting system for a vehicle comprises a side obstacle detector configured to detect an obstacle present in an obstacle detection area; an obstacle approach prevention controller configured to implement an obstacle approach prevention control which assists an approach prevention for preventing the vehicle from approaching an obstacle detected by the side obstacle detector; an overtaking state detector configured to detect an overtaking state which is at least one of a first state where the vehicle is overtaking the obstacle detected by the side obstacle detector and a second state where the vehicle is estimated to overtake the obstacle. The overtaking state detector is configured to detect the overtaking state based at least on (i) a distance between the vehicle and the obstacle, (ii) a speed of the vehicle relative to the obstacle, and (iii) a detection angle of the obstacle relative to the vehicle.

17 Claims, 15 Drawing Sheets

FIG. 15
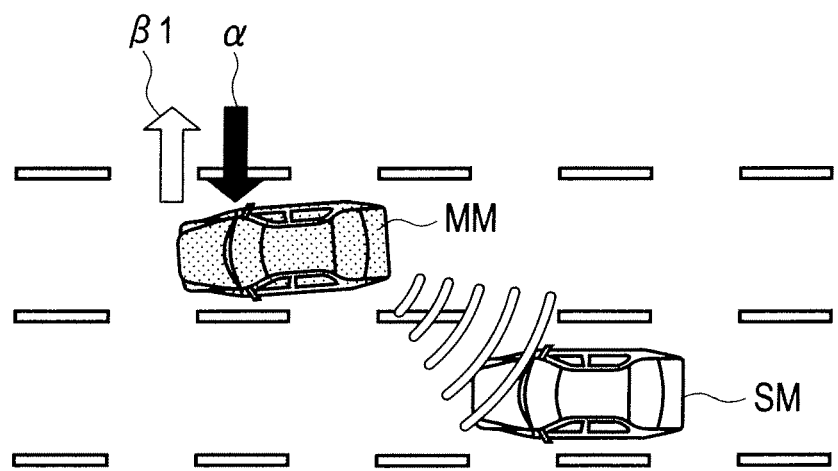
(a)
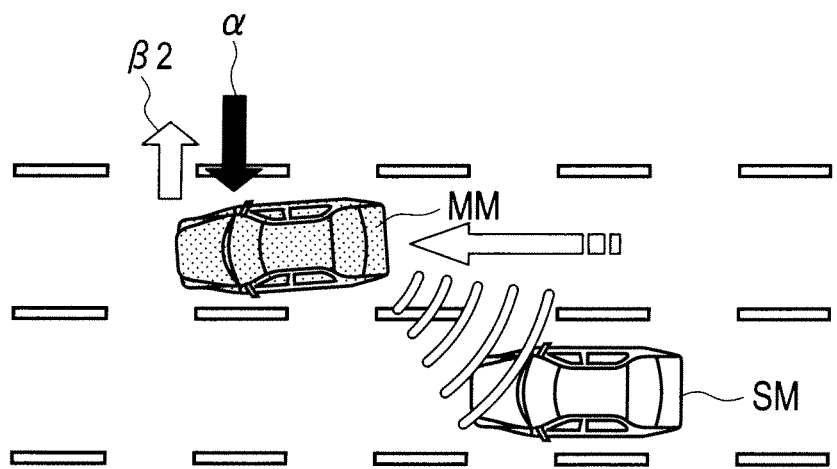
(b)

VEHICLE DRIVING ASSISTANT AND VEHICLE DRIVING ASSISTING METHOD

TECHNICAL FIELD

The present invention relates to a vehicle driving assistant and a vehicle driving assisting method for assisting driving operation of a driver such that the driver's own vehicle can be prevented from approaching an obstacle positioned in a posterolateral direction of the own vehicle.

BACKGROUND ART

As a conventional vehicle driving assistant, for example, there is a technology described in Patent Literature 1. According to this technology, the obstacle in the posterolateral direction of the driver's own vehicle is detected, and when the obstacle is detected, it is determined that the driving assist control with respect to the obstacle is necessary, thereby suppressing steering operation by the driver. It is disclosed that the above operations prevent the own vehicle's approach to the obstacle.

CITATION LIST

Patent Literature

Patent Literature 1: Japanese Patent Unexamined Publication No. Heisei 8 (1996)-253160

SUMMARY OF INVENTION

Technical Problem

However, according to the technology described in the Patent Literature 1, even when the driver makes the steering operation to the obstacle side while recognizing the obstacle, if the obstacle is present in posterolateral direction of the own vehicle, the own vehicle is so controlled as to prevent approach to the obstacle. Thus, such control may give discomfort to the driver.

The present invention has been made in view of the above points. It is an object of the present invention to provide a vehicle driving assistant that lowers discomfort given to the driver and is capable of properly implementing driving assist control with respect to the obstacle positioned in the posterolateral direction of the own vehicle.

Solution to Problem

For solving the above problem, according to the first aspect of the present invention, there is provided a vehicle driving assistant including: a side obstacle detector for detecting an obstacle present in an obstacle detection area, with at least a posterolateral direction of an own vehicle as the obstacle detection area; an obstacle approach prevention controller for implementing an obstacle approach prevention control which assists an approach prevention for preventing the own vehicle from approaching the obstacle detected by the side obstacle detector; an overtaking state detector for detecting an overtaking state which is at least one of a first state where the own vehicle is overtaking the obstacle detected by the side obstacle detector and a second state where the own vehicle is estimated to overtake the obstacle; and a control suppressor, when a determination that the overtaking state is established is made based on the detecting by the overtaking state detector, for suppressing the obstacle approach prevention control compared with when the determination that the overtaking state is established is not made.

Moreover, according to the second aspect of the present invention, there is provided a vehicle driving assisting method including: a side obstacle detecting operation for detecting an obstacle present in an obstacle detection area, with at least a posterolateral direction of an own vehicle as the obstacle detection area; an obstacle approach prevention controlling operation for implementing an obstacle approach prevention control which assists an approach prevention for preventing the own vehicle from approaching the obstacle detected by the side obstacle detector; an overtaking state detecting operation for detecting an overtaking state which is at least one of a first state where the own vehicle is overtaking the obstacle detected by the side obstacle detecting operation and a second state where the own vehicle is estimated to overtake the obstacle; and a control suppressing operation, when a determination that the overtaking state is established is made based on the detection of the overtaking state detecting operation, for suppressing the obstacle approach prevention control compared with when the determination that the overtaking state is established is not made.

Advantageous Effects of Invention

When the driver's own vehicle approaches the obstacle to thereby satisfy the start condition of the obstacle approach prevention control in a situation where it can be determined that the driver's own vehicle is in a state of overtaking the obstacle or in a state estimated to overtake the obstacle, it is assumed that the driver has an intention of making a lane change to the obstacle side while recognizing the presence of the obstacle. Under the present invention, in such a case, the obstacle approach prevention control is suppressed, as a result, making it possible to suppress discomfort of the driver. That is, while lowering the discomfort given to the driver, the present invention can properly implement the driving assist control with respect to the obstacle positioned in the posterolateral direction of the own vehicle.

BRIEF DESCRIPTION OF DRAWINGS

FIG. 15 is a diagram for explaining the operation according to the fifth embodiment of the present invention.

DESCRIPTION OF EMBODIMENTS

Hereinafter, embodiments of the present invention will be set forth referring to drawings.

First Embodiment

According to the first embodiment, an explanation is made about a case where a vehicle driving assistant is installed to a rear-wheel drive vehicle. Herein, as a target vehicle, a front-wheel drive vehicle or a four-wheel drive vehicle can also be used. In addition, an electric vehicle (EV) or a hybrid vehicle can also be used.
(Structure)

Figure 1:
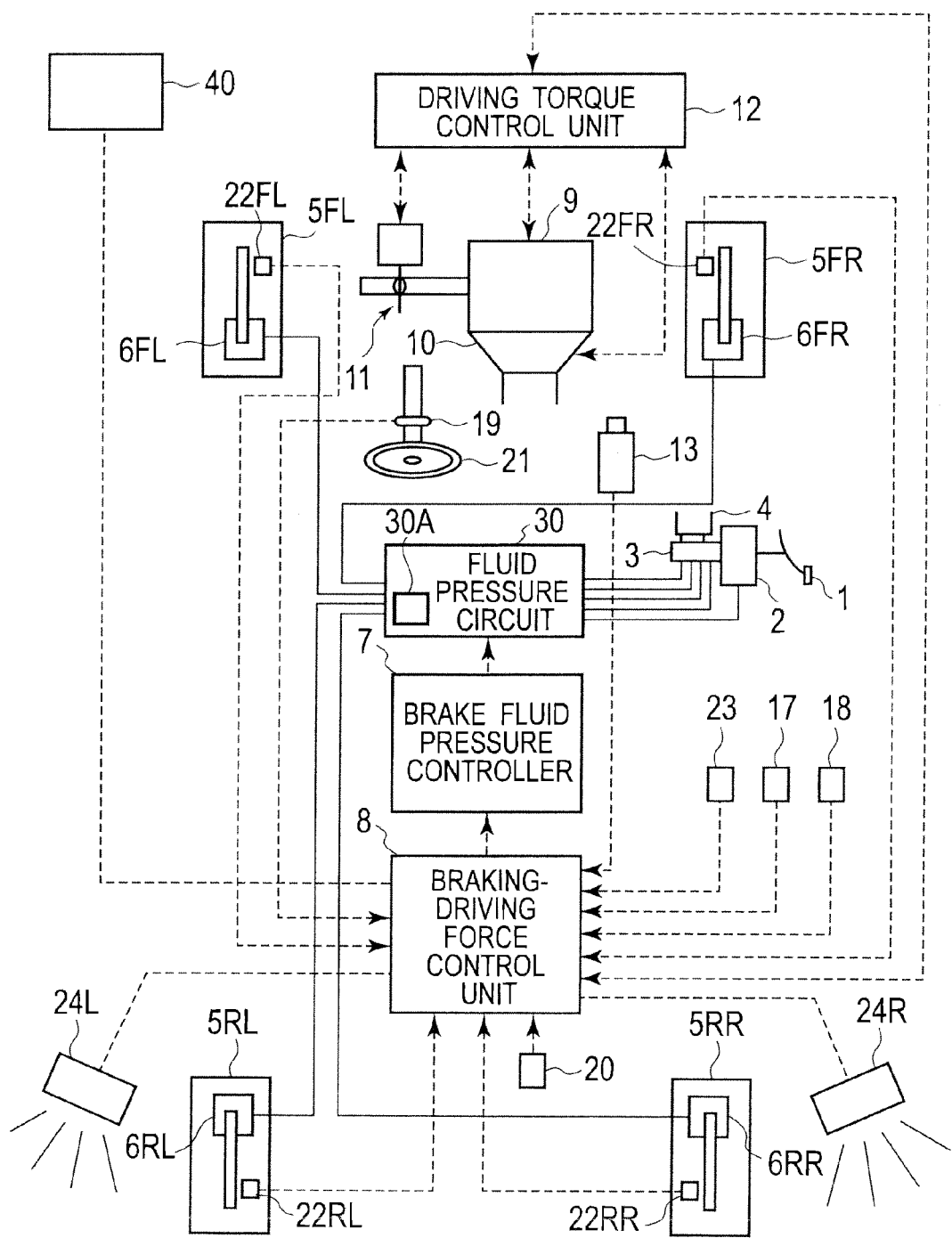
FIG. 1 is a schematic structural view of a vehicle driving assistant according to the first embodiment of the present invention.

FIG. 1 is a schematic structural view of the vehicle driving assistant according to the first embodiment.

In FIG. 1, reference numeral 1 denotes a brake pedal. The brake pedal 1 is connected to a master cylinder 3 via a booster 2. Moreover, reference numeral 4 in FIG. 1 denotes a reservoir.

The master cylinder 3 is connected to wheel cylinders 6FL, 6FR, 6RL, 6RR of respective wheels 5FL, 5FR, 5RL, 5RR via a fluid pressure circuit 30. Thereby, in a state where a braking control is inoperative, the master cylinder 3 increases the brake fluid pressure according to the driver's depression amount of the brake pedal 1. The thus increased brake fluid pressure is supplied through the fluid pressure circuit 30 to each of the wheel cylinders 6FL, 6FR, 6RL, 6RR of the respective wheels 5FL, 5FR, 5RL, 5RR.

A brake fluid pressure controller 7 controls an actuator 30A in the fluid pressure circuit 30, to thereby individually control the brake fluid pressure to each of the wheels 5FL, 5FR, 5RL, 5RR. Then, to a value in accordance with a command value from a braking-driving force control unit 8, the brake fluid pressure controller 7 controls the brake fluid pressure to each of the wheels 5FL, 5FR, 5RL, 5RR. As the actuator 30A, there are provided proportional solenoid valves which are disposed corresponding to the respective wheel cylinders 6FL, 6FR, 6RL, 6RR and which can individually control the fluid pressures of the respective wheel cylinders 6FL, 6FR, 6RL, 6RR each at an arbitrary brake fluid pressure.

Herein, the brake fluid pressure controller 7 and fluid pressure circuit 30 may use a brake fluid pressure controller which is used, for example, for an antiskid control (ABS), a traction control (TCS) or a vehicle dynamics control unit (VDC). The brake fluid pressure controller 7 may otherwise be so configured that the brake fluid pressure controller 7 can alone, that is, instead of via the fluid pressure circuit 30, control the brake fluid pressure of each of the wheel cylinders 6FL, 6FR, 6RL, 6RR. Then, when a brake fluid pressure command value is inputted to the brake fluid pressure controller 7 from an after-described braking-driving force control unit 8, the brake fluid pressure controller 7 controls each brake fluid pressure according to the brake fluid pressure command value.

Moreover, this vehicle has a driving torque control unit 12. The driving torque control unit 12 controls a driving torque to the rear wheels 5RL, 5RR each as a driving wheel. This control can be accomplished by controlling an operating state of an engine 9, a selective gear ratio of an automatic transmission 10 and a throttle opening of a throttle valve 11. That is, the driving torque control unit 12 controls fuel injection amount or ignition timing. Moreover, simultaneously, the driving torque control unit 12 controls the throttle opening. By these operations, the driving torque control unit 12 controls the operating state of the engine 9.

Moreover, the driving torque control unit 12 outputs the value of a driving torque Tw (as information for control) to the braking-driving force control unit 8.

Otherwise, the driving torque control unit 12 can alone, that is, instead of via the braking-driving force control unit 8, control the driving torque Tw of the rear wheels 5RL, 5RR. However, when the driving toque command value is inputted from the braking-driving force control unit 8, the driving torque control unit 12 controls the driving torque Tw according to the thus inputted driving torque command value.

Moreover, the front portion of the vehicle has an image pickup portion 13 having an image processing function. The image pickup portion 13 is used for detecting a position of the driver's own vehicle MM (refer to FIG. 2) in a travel lane. The image pickup portion 13 has a monocular camera which is made, for example, of a CCD (Charge Coupled Device) camera.

The image pickup portion 13 takes an image of the forward direction of the own vehicle MM. Then, the image pickup portion 13 implements an image processing of the thus taken image in the forward direction of the own vehicle MM, detects a lane marking such as a white line 200 (lane marker) and the like (refer to FIG. 7), and then detects the travel lane based on the thus detected white line 200.

Moreover, based on the thus detected travel lane, the image pickup portion 13 calculates an angle (yaw angle) $\phi f$ formed by the travel lane of the own vehicle MM and a fore-and-aft direction axis of the own vehicle MM, a lateral displacement $Xf$ relative to the travel lane, a curvature $\beta$ of the travel lane, and the like. The image pickup portion 13 outputs the thus calculated yaw angle $\phi f$, lateral displacement $Xf$, curvature $\beta$ of travel lane, and the like to the braking-driving force control unit 8.

Herein, the image pickup portion 13 detects the white line 200 as the travel lane, and then, based on the thus detected line 200, calculates the yaw angle $\phi f$. Therefore, the accuracy of detecting the yaw angle $\phi f$ is greatly influenced by the image pickup portion 13's accuracy of detecting the white line 200.

Otherwise, the curvature $\beta$ of the travel lane may be calculated based on a steering angle $\delta$ of an after-described steering wheel 21.

Figure 2:
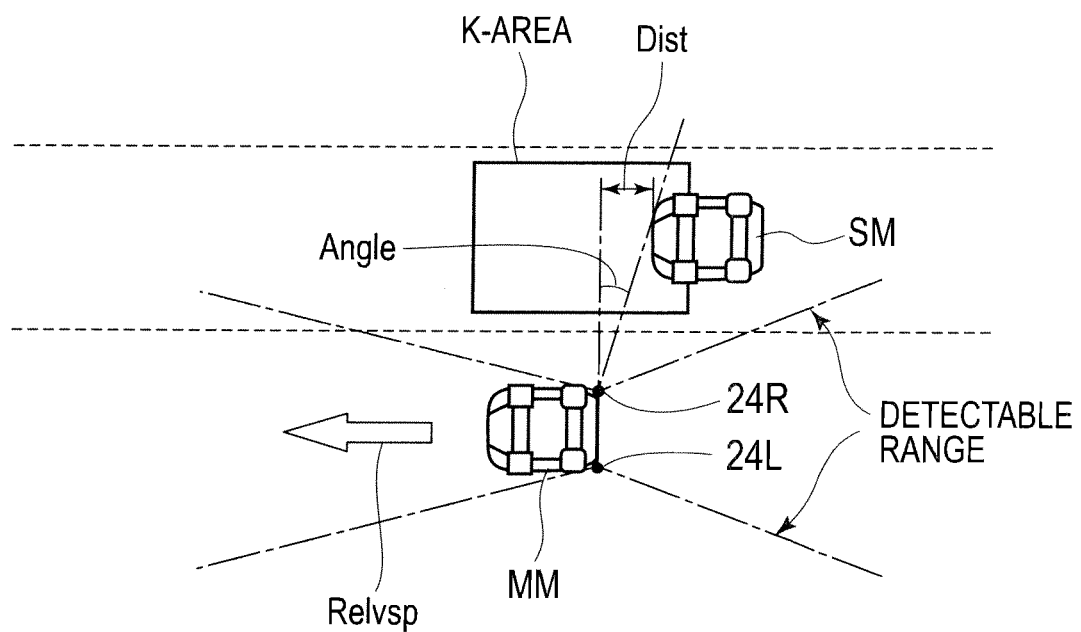
FIG. 2 is a conceptual diagram for explaining an obstacle detection area and the like in a posterolateral direction of the own vehicle.

Moreover, the vehicle has radar devices 24L/24R. The radar devices 24L/24R are sensors for detecting an obstacle SM (refer to FIG. 2) present in the posterolateral direction on respective left and right sides. The radar devices 24L/24R are, as shown in FIG. 2, capable of detecting the obstacle SM in the sideward direction of the own vehicle MM. Then, of the detectable range, the radar devices 24L/24R set, as an obstacle detectable area K-AREA, at least an area which is positioned in the posterolateral direction of the own vehicle and is (driver's) dead angle. When the obstacle SM is present in the obstacle detection area K-AREA, the radar devices 24L/24R determine that the obstacle SM is present. Moreover, on each of respective left and right sides, the radar devices 24L/24R can detect, a relative lateral position POSXobst, a relative longitudinal position DISTobst, and a relative longitudinal speed dDistobst which are defined relative to the obstacle SM. Herein, according to the first embodiment, an extended direction of the travel lane of the own vehicle MM is defined as a longitudinal direction and a widthwise direction of the travel lane of the own vehicle MM is defined as a lateral direction. In addition, the radar devices 24L/24R each are made, for example, of a millimeter wave radar.

Moreover, this vehicle has a radar device 23. The radar device 23 is a sensor for detecting the obstacle SM present in the forward direction of the own vehicle MM. The radar device 23 can detect a distance Dist_pre between the own vehicle MM and the forward obstacle SM and a relative speed Relvsp_pre between the own vehicle MM and the forward obstacle SM.

Moreover, this vehicle has a master cylinder pressure sensor 17, an accelerator opening sensor 18, a steering angle sensor 19, a direction indicator switch 20, and wheel speed sensors 22FL, 22FR, 22LR, 22RR.

The master cylinder pressure sensor 17 detects the output pressure of the master cylinder 3, that is, a master cylinder fluid pressure Pm. The accelerator opening sensor 18 detects the depression amount of the accelerator pedal, that is, an accelerator opening $\theta t$ (or accelerator depression amount $\theta t$). The steering angle sensor 19 detects a steering angle $\delta$ of the steering wheel 21. The direction indicator switch 20 detects a direction indicating operation by a direction indicator. The wheel speed sensors 22FL, 22FR, 22LR, 22RR detect rotational speeds of the respective of the wheels 5FL, 5FR, 5RL, 5RR, which speeds are each what is called a wheel speed Vwi (i=fl, fr, rl, rr). Then, these sensors and the like output the thus detected signals to the braking-driving force control unit 8.

A navigation system 40 is installed to this vehicle. Together with road information such as map information and the like including road curvature, the navigation system 40 outputs to the braking-driving force control unit 8 route information which is set based on the driver's input of destination.

Figure 3:
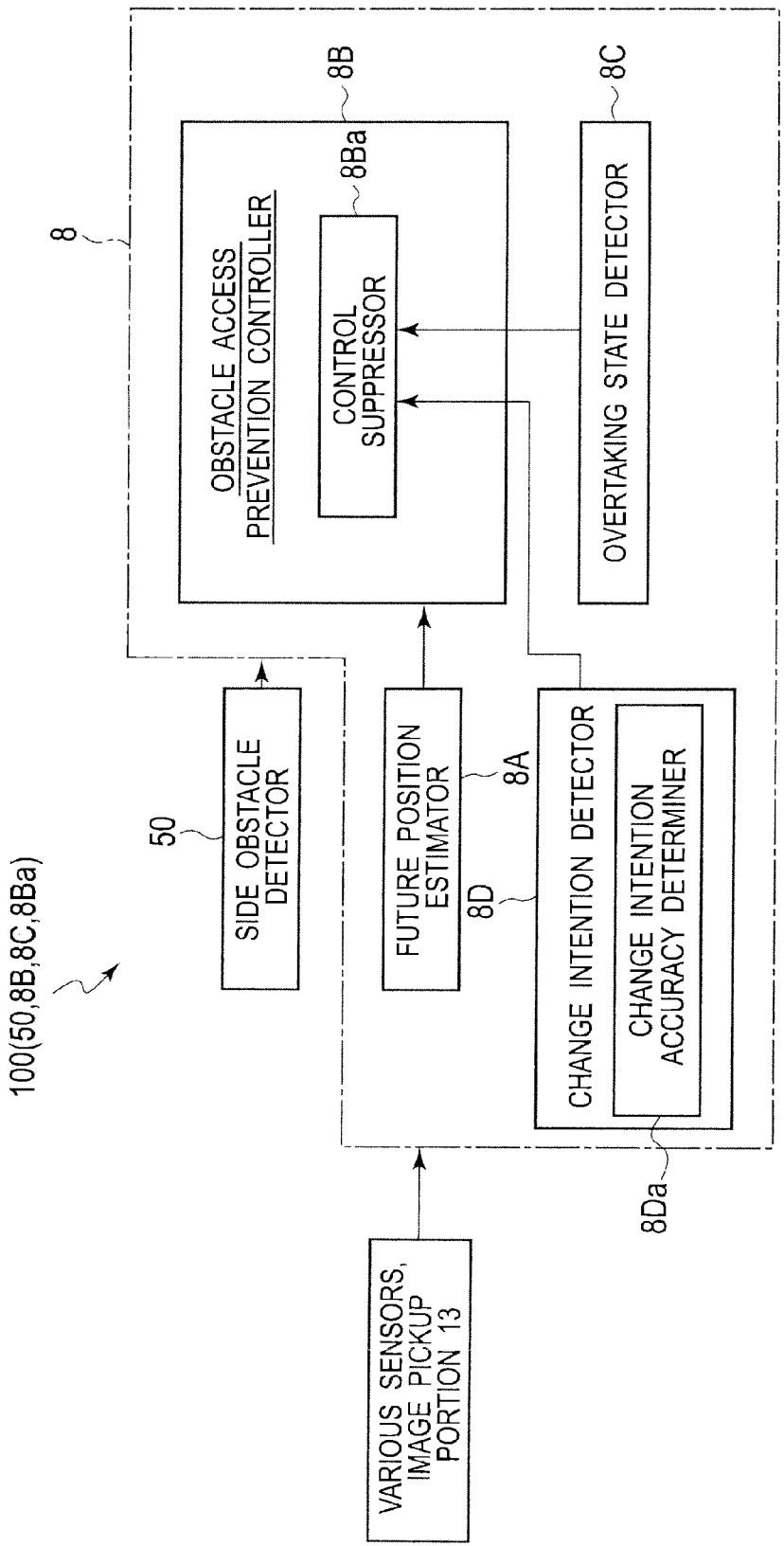
FIG. 3 is a diagram for explaining the structure of a control unit.

FIG. 3 is a block diagram schematically showing processings of the braking-driving force control unit 8. The processings of the braking-driving force control unit 8 are implemented based on an after-described flowchart shown in FIG. 4, however, FIG. 3 denotes the processings schematically as a block.

As shown in FIG. 3, the braking-driving force control unit 8 has a future position estimator 8A, an obstacle approach prevention controller 8B, an overtaking state detector 8C and a change intention detector 8D. Moreover, the obstacle approach prevention controller 8B has a control suppressor 8Ba.

Based on the driver's steering input detected by a steering input detector, the future position estimator 8A estimates an own vehicle future position (own vehicle's future position in the widthwise direction of the travel lane, or an after-described own vehicle estimated position $\Delta Xb$) after an elapse of a forward watching time Tt.

A side obstacle detector 50 is equivalent to the radar devices 24L/24R and detects pieces of information of the obstacle SM with reference to the own vehicle MM, the information including the presence or absence of the obstacle SM of the obstacle detection area K-AREA in the posterolateral direction of the own vehicle MM, the relative lateral position POSXobst of the obstacle SM, the relative longitudinal position DISTobst, the relative longitudinal speed dDistobst and the like.

The obstacle approach prevention controller 8B implements an obstacle approach prevention control for assisting prevention of the own vehicle MM from approaching the obstacle SM detected by the side obstacle detector 50. Specifically, in a case where it is determined that the side obstacle detector 50 detects the obstacle SM in the posterolateral direction of the own vehicle MM, the obstacle approach prevention controller 8B detects start of the obstacle approach prevention control when the lateral position of an own vehicle future position 150 reaches a control start position 60 (a certain lateral portion in the widthwise direction of lane, refer to an after-described FIG. 7) and then implements the obstacle approach prevention control.

Based on the information detected by the side obstacle detector 50, that is, the information of the obstacle SM with reference to the own vehicle MM, the overtaking state detector 8C detects an overtaking state which is defined as at least one of a first state where the own vehicle MM is overtaking the obstacle SM and a second state where it is estimated that the own vehicle MM will overtake the obstacle SM, and then the overtaking state detector 8C outputs the thus detected information to the control suppressor 8Ba.

The change intention detector 8D calculates a lane change intention accuracy of the driver. When the thus calculated lane change intention accuracy is high, the change intention detector 8D determines that the driver has a lane change intention, to thereby output such information to the control suppressor 8Ba.

When a determination that the overtaking state is established is made based on the detecting by the overtaking state detector 8C, the control suppressor 8Ba suppress the obstacle approach prevention control compared with when the determination that the overtaking state is established is not made.

Figure 4:
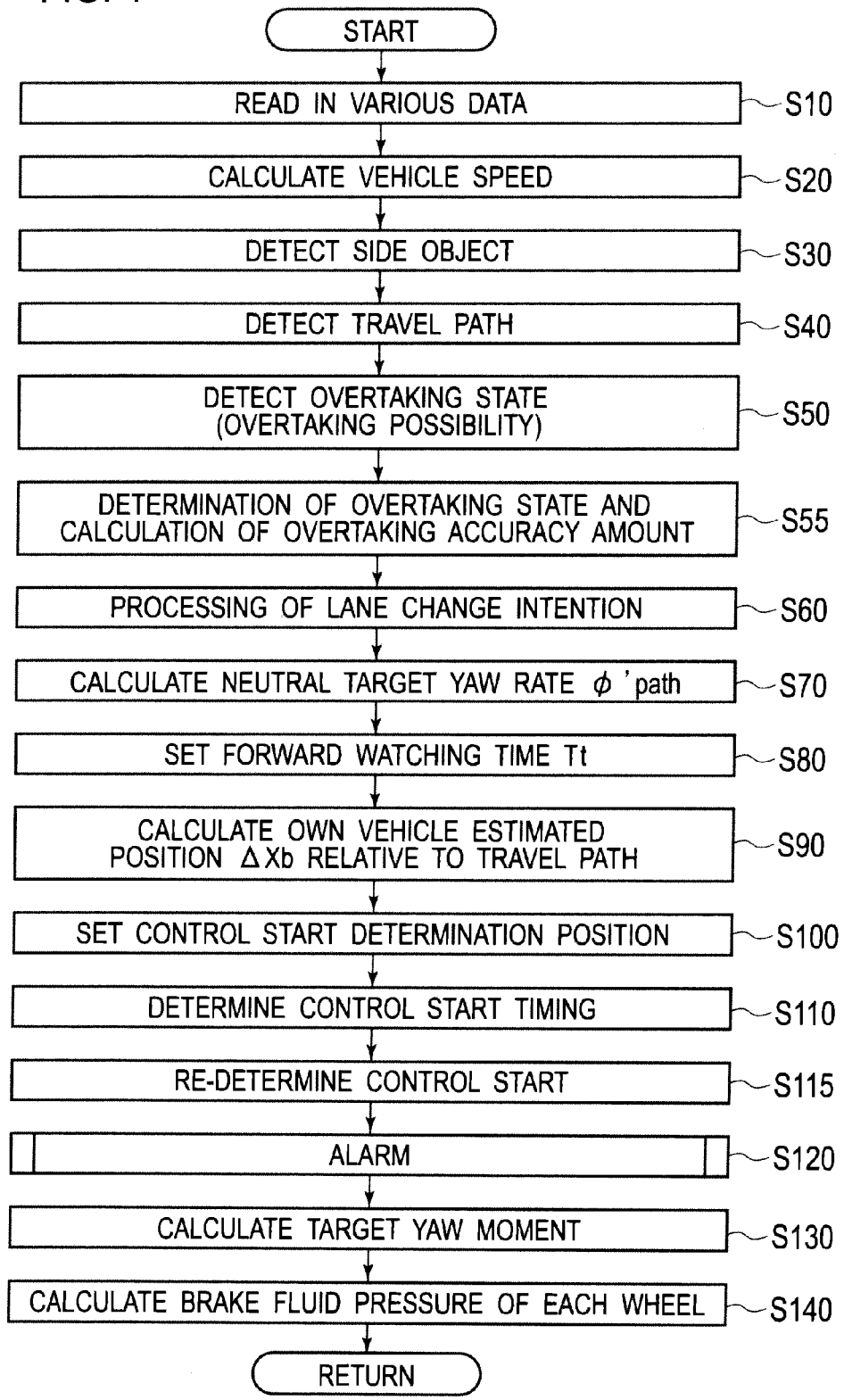
FIG. 4 is a flowchart showing the processing procedure of the control unit according to the first embodiment of the present invention.

FIG. 4 is a flowchart showing a prevention control processing procedure implemented by the braking-driving force control unit 8.

The prevention control processing procedure is implemented by timer interruption per certain sampling time $\Delta T$ (for example, every 10 msec). Herein, the prevention control processing shown in FIG. 4 does not have a communication processing, however, renewal of the information acquired by a calculation processing is memorized in a memory as needed and necessary information will be read out from the memory as needed.

<Step S10>

At first, at step S10, the braking-driving force control unit 8 reads in various data from each of the above sensors, controllers and control units. Specifically, the braking-driving force control unit 8 acquires each wheel speed Vwi (i=fl, fr, rl, rr), the steering angle $\delta$, the accelerator opening $\theta t$, the master cylinder fluid pressure Pm, which are detected by each of the sensors including the wheel speed sensors 22FL, 22FR, 22LR, 22RR, the steering angle sensor 19, the accelerator opening sensor 18, and the master cylinder pressure sensor 17. Moreover, the braking-driving force control unit 8 acquires i) the direction switch signal of the direction indicator switch 20, ii) the yaw angle $\phi f$, the lateral displacement Xf, the travel lane's curvature $\beta$ which are detected by the image pickup portion 13, and iii) the side obstacle SM's information detected by the radar devices 24L/24R (side obstacle detector 50).

<Step S20>

Then, at step S20, the braking-driving force control unit 8 calculates a vehicle speed V. That is, based on the wheel speed Vwi (i=fl, fr, rl, rr) detected by the wheel speed sensors 22FL, 22FR, 22LR, 22RR, the braking-driving force control unit 8 calculates the vehicle speed V as shown in the following expression (1).

$$V=(Vwrl+Vwrr)/2 \text{ (for front-wheel drive)},$$

$$V=(Vwfl+Vwfr)/2 \text{ (for rear-wheel drive)} \quad (1)$$

Herein, Vwfl and Vwfr denote wheel speeds of left and right front wheels respectively. Vwrl and Vwrr denote wheel speeds of left and right rear wheels respectively. That is, in the expression (1), the vehicle speed V is calculated as an average of the wheel speeds of follower (driven) wheels. According to the first embodiment, the vehicle has the rear-wheel drive, therefore, the latter expression, that is, the wheel speeds Vwfl and Vwfr of the respective left and right front wheels 5FL and 5FR are used for calculation of the vehicle speed V.

Moreover, when another automatic braking controller such as ABS (Anti-lock Brake System) control is in operation, an estimated vehicle speed estimated by such automatic braking controller is acquired, and used as the above vehicle speed V.

<Step S30>

At step S30, based on the signals from the radar devices 24L/24R on respective left and right sides, the braking-driving force control unit 8 determines presence Lobst·Robst of the obstacle SM (present or absent) with respect to the obstacle detection area K-AREA set in the left and right posterolateral directions of the own vehicle MM. Moreover, the braking-driving force control unit 8 acquires the posterolateral obstacle SM's position and speed relative to the own vehicle MM. Herein, the posterolateral direction of the own vehicle MM indicates side and rearward positions of the own vehicle MM. That is, the posterolateral direction of the own vehicle MM includes a diagonally rearward position of the own vehicle MM.

<Step S40>

Then, at step S40, from the image pickup portion 13, the braking-driving force control unit 8 reads in the lateral displacement Xf of the own vehicle MM and the curvature β of the travel lane with respect to the travel road where the own vehicle MM is currently traveling.

However, acquiring of the curvature β of the travel lane is not limited to the calculation based on the image taken by the image pickup portion 13. Otherwise, for example, the curvature information of the travel lane in the own vehicle's position may be acquired based on the map information memorized in the navigation system 40.

Then, the own vehicle MM's yaw angle φf relative to the travel road on which the driver is currently driving is calculated. The yaw angle φf is used for detecting the travel state in the lane.

According to the first embodiment, the yaw angle φf can be detected, for example, by the following operations: an image in the vehicle's forward direction which image was taken by the image pickup portion 13 is converted into an overhead image, and the white line 200 (lane marker)'s angle relative to the upward-downward direction of the thus converted image is obtained.

Otherwise, the yaw angle φf may be calculated based on the white line 200 adjacent to the own vehicle MM in the image taken by the image pickup portion 13. In this case, for example, a change amount of the lateral displacement Xf of the own vehicle MM is used, to thereby calculate the yaw angle φf by the following expression (2). Herein, the lateral displacement Xf is a position in the widthwise direction in the travel lane of the own vehicle MM with reference to the white line 200 (lane marker) and is equivalent to a distance from the white line 200 to the own vehicle MM.

$$\phi' = \tan^{-1}(dX'/V(=dX/dY)) \quad (2)$$

Herein, dX denotes a change amount of the lateral displacement Xf per unit time, dY denotes a change amount of the traveling direction per unit time, and dX' denotes differential value of the change amount dX.

Herein, when the yaw angle φf is calculated based on the adjacent white line 200, as shown by the above expression (2), the calculation of the angle φf is not limited to by using the lateral displacement Xf. Otherwise, for example, the white line 200 detected adjacent to the own vehicle MM is extended far away, and then the yaw angle φf may be calculated based on the thus extended white line 200. The calculation method (based on the vehicle's forward image) of the lateral displacement Xf of the own vehicle MM, the curvature β of the travel lane, the yaw angle φf and the like is a known art which is already adopted for various devices (such as lane follow-up travel controller and the like) for controlling the own vehicle MM by recognizing the white line 200. Thus, detailed explanation of such a known calculation method is omitted.

<Step S50>

At step S50, the own vehicle MM's overtaking state relative to the obstacle SM is detected.

Detection of the overtaking state is implemented based on the information of the relative distance Dist, relative speed Relvsp and detection angle Angle which are each the obstacle SM's information (detected with reference to the own vehicle MM) detected by the radar devices 24L/24R (side obstacle detector 50). Relation between the relative distance Dist, relative speed Relvsp and detection angle Angle is shown in FIG. 2.

The relative distance Dist is the obstacle SM's distance relative to the own vehicle MM and is equivalent to the relative longitudinal position DISTobst. The relative speed Relvsp is the own vehicle MM's speed relative to the obstacle SM and can be calculated, for example, by differentiating the relative longitudinal position DISTobst. The relative speed Relvsp is set positive when the own vehicle MM is in a direction away from the side obstacle SM (when the own vehicle speed V in the traveling direction of the own vehicle MM is greater than the speed of the obstacle SM). The detection angle Angle is the obstacle SM's detection angle relative to the own vehicle MM and can be acquired from the relative lateral position POSXobst and relative longitudinal position DISTobst. The detection angle Angle is set to 0 degree when the obstacle SM is in a position immediately lateral to the own vehicle MM. Then, with reference to the position immediately lateral to the own vehicle MM, the detection angle Angle becomes greater as the obstacle SM's position relative to the own vehicle MM is positioned in more rearward direction of the own vehicle MM. The detection angle Angle is set to 90 degrees when the obstacle SM is in a position immediately posterior to the own vehicle MM. Herein, the immediately lateral position may be set, for example, as an immediately lateral position of a position for setting the radar devices 24L/24R or an immediately lateral position of the vehicle's gravity center.

Then, when the following conditions (a) to (c) are satisfied, it is detected that possibility that the overtaking state is established is high, based on the left obstacle SM's information with reference to the own vehicle MM. Otherwise, detection that the possibility that the overtaking state is established is high may be made when any of the following conditions (a) to (c) is satisfied. However, for more accurately detecting that the possibility that the overtaking state is established is high, satisfying all conditions (a) to (c) is preferable.

(a) relative distance Dist>determination threshold KD1 of relative distance Dist (b) relative speed Relvsp>determination threshold KR1 of relative speed Relvsp (c) detection angle Angle>determination threshold KA1 of detection angle Angle Herein, the determination threshold KD1 of the relative distance Dist is set, for example, to 3 m. The determination threshold KR1 of the relative speed Relvsp is set, for example, to 2 m/s to 3 m/s. The determination threshold KA1 of the detection angle Angle is set, for example, to 40 degrees to 45 degrees. Herein, the overtaking state is defined as a first state where the own vehicle MM can change the lane to the obstacle SM side after the own vehicle MM overtook the obstacle SM or a second state that such possibility of lane change is estimated. Thus, the determination thresholds KD1, KR1 and KA1 are set through empirical values or experiments based on the above first or second states.

<Step S55>

Then, when the detection that the possibility that the overtaking state is established is high continues for a certain time for determining overtaking (or when interruption processings are implemented continuously at a certain frequency), determination of whether or not the overtaking state is established is made at step S55. The determination of the above continuation can be made based on values of a counter used for counting up the processings. Otherwise, however, even when the detection that the possibility that the overtaking state is established is high does not continue for the certain time for determining overtaking, provided that the above conditions (a) to (c) be satisfied, the determination of whether or not the overtaking state is established may be made at step S55. According to the first embodiment, for accurately making the determination that the possibility that the overtaking state is high is established, the determination of whether or not the overtaking state continues for the certain time for determining overtaking is made, as stated above.

Figure 5:
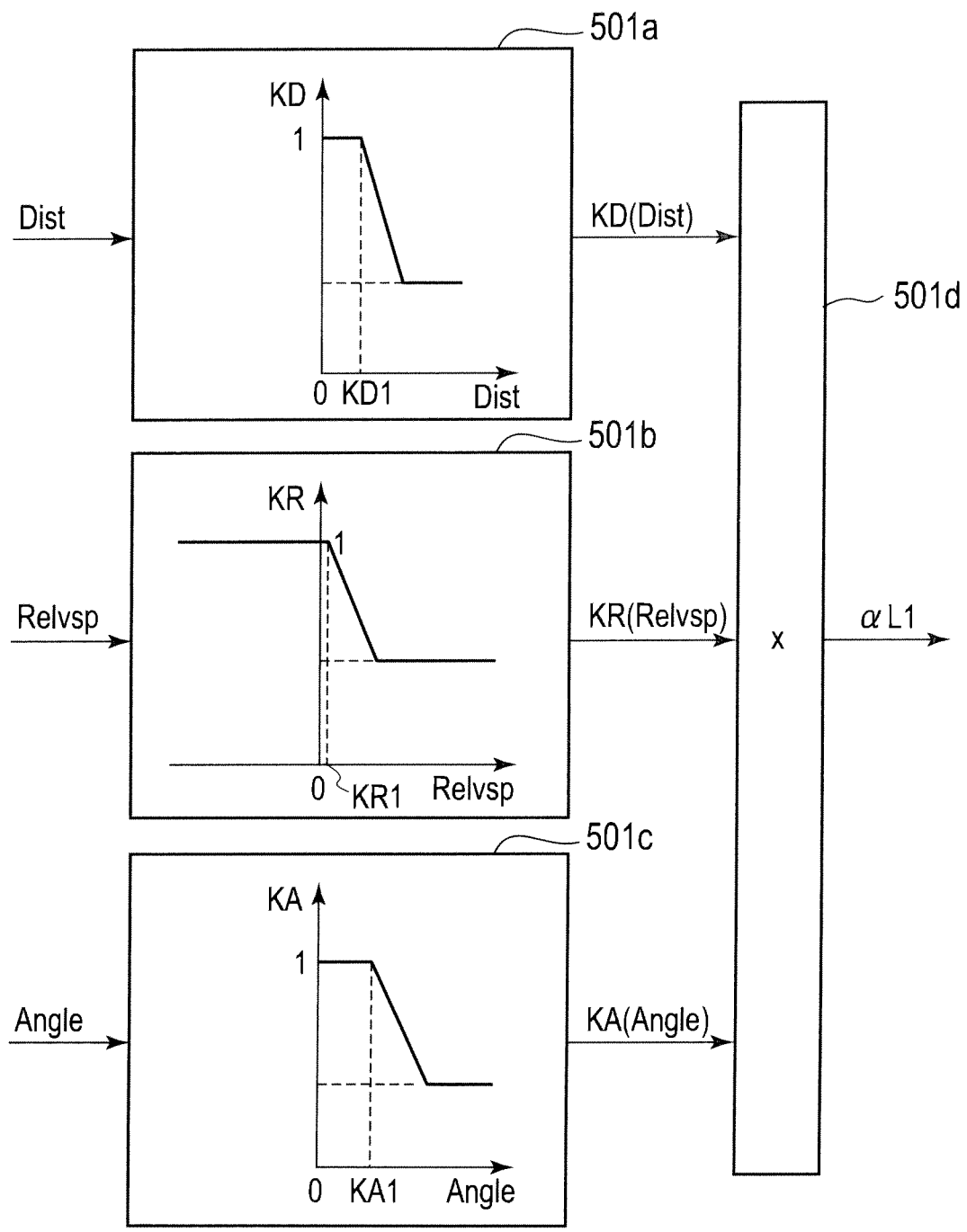
FIG. 5 is a block diagram showing a concept of calculation of a left overtaking accuracy amount.

Moreover, at step S55, based on the left obstacle SM's information with reference to the own vehicle MM, a left overtaking accuracy amount αL1 is calculated, as shown in FIG. 5.

That is, based on the following expression, the left overtaking accuracy amount αL1 is calculated. Herein, when it is determined at step S50 that the conditions (a) to (c) are not satisfied, the left overtaking accuracy amount αL1 is set to 1 at this step S55.

$$\alpha L1 = KD(Dist) \times KR(Relvsp) \times KA(Angle)$$

Herein, KD (Dist) is a value calculated with the relative distance Dist as variable and based on a map shown in a first overtaking accuracy amount calculator 501a in FIG. 5. The KD (Dist) becomes a certain value when the relative distance Dist is less than or equal to the determination threshold KD1 of the relative distance Dist, while KD (Dist) becomes smaller as the relative distance Dist becomes larger than the determination threshold KD1 of the relative distance Dist. In place of the map, the KD (Dist) may be calculated in the following manner: the map shown in FIG. 5 is memorized in advance as a function, and then the thus memorized function is used.

The KR (Relvsp) is calculated with the relative speed Relvsp as variable and based on the map shown in a second overtaking accuracy amount calculator 501b in FIG. 5. The KR (Relvsp) becomes a certain value when the relative speed Relvsp is smaller than or equal to the determination threshold KR1 of the relative speed Relvsp, while the KR (Relvsp) becomes smaller as the relative speed Relvsp becomes larger than the determination threshold KR1. In place of the map, the KR (Relvsp) may be calculated in the following manner: the map shown in FIG. 5 is memorized in advance as a function, and then the thus memorized function is used.

The KA (Angle) is calculated with the detection angle Angle as variable and based on the map shown in a third overtaking accuracy amount calculator 501c in FIG. 5. The KA (Angle) becomes a certain value when the detection angle Angle is smaller than or equal to the determination threshold KA1 of the detection angle Angle, while the KA (Angle) becomes smaller as the detection angle Angle is larger than the determination threshold KA1. In place of the map, the KA (Angle) may be calculated in the following manner: the map shown in FIG. 5 is memorized in advance as a function, and then the thus memorized function is used.

Then, when the left overtaking accuracy amount αL1 becomes less than or equal to a certain overtaking detection threshold, it is detected that the overtaking state is established. The overtaking detection threshold is set to less than 1. This overtaking detection threshold varies depending on to what extent the overtaking detection accuracy is set. However, the overtaking detection threshold may be set from experiments or empirical values.

Herein, FIG. 5 is a block diagram showing the concept of calculating the left overtaking accuracy amount αL1. Referring to the block diagram, an explanation is made about examples of processing for calculating the left overtaking accuracy amount αL1.

Based on the relative distance Dist, the first overtaking accuracy amount calculator 501a calculates the first overtaking accuracy amount KD (Dist) by referring to the first overtaking accuracy amount calculation map.

Herein, the first overtaking accuracy amount calculation map has an ordinate representing the first overtaking accuracy amount KD and an abscissa representing the relative distance Dist. Then, the first overtaking accuracy amount calculation map is so set that KD=1 is satisfied until the relative distance Dist reaches its determination threshold KD1 and then, in the region over the determination threshold KD1, the larger the relative distance Dist is, the smaller the first overtaking accuracy amount KD is.

Based on the relative speed Relvsp, the second overtaking accuracy amount calculator 501b calculates the second overtaking accuracy amount KR (Relvsp) by referring to the second overtaking accuracy amount calculation map.

Herein, the second overtaking accuracy amount calculation map has an ordinate representing the second overtaking accuracy amount KR and an abscissa representing the relative speed Relvsp. Then, the second overtaking accuracy amount calculation map is so set that KR=1 is satisfied until the relative speed Relvsp reaches its determination threshold KR1 and then, in the region over the determination threshold KR1, the larger the relative speed Relvsp is, the smaller the second overtaking accuracy amount KR is.

Based on the detection angle Angle of the posterolateral obstacle SM, the third overtaking accuracy amount calculator 501c calculates the third overtaking accuracy amount KA (Angle) by referring to the third overtaking accuracy amount calculation map.

Herein, the third overtaking accuracy amount calculation map has an ordinate representing the third overtaking accuracy amount KA and an abscissa representing the detection angle Angle. Then, the third overtaking accuracy amount calculation map is so set that KA=1 is satisfied until the detection angle Angle reaches its determination threshold KA1 and then, in the region over the determination threshold KA1, the larger the detection angle Angle is, the smaller the third overtaking accuracy amount KA is.

Herein, each of the first, second and third overtaking accuracy amounts KD, KR and KA is set to have a lower limit (>0).

According to the first embodiment, the detection accuracy of the overtaking state can be determined to be higher in the following conditions: the greater the relative distance Dist is, the greater the relative speed Relvsp is, and the closer to 90 degrees the detection angle Angle is.

An overtaking accuracy amount output 501d receives (input) the first, second and third overtaking accuracy amounts KD, KR and KA and outputs the final overtaking accuracy amount αL1. Herein, the first, second and third overtaking accuracy amounts KD, KR and KA are multiplied, to thereby calculate the overtaking accuracy amount αL1.

Herein, the detection of the overtaking state is implemented by, for example, whether or not the following expression is satisfied.

$$\alpha L1 < D\_\alpha L1$$

Hereinabove, D_αL1 is a certain value (overtaking detection threshold) acquired through experiments and the like and is less than or equal to 1. For setting higher the accuracy of overtaking state detection, D_αL1 may be set to a small value such as 0.5. Herein, when αL1 is smaller than 1, it is determined that any of the above conditions (a) to (c) is satisfied. Then, it is indicated that the smaller the αL1 is, the higher the accuracy of overtaking state detection is.

Moreover, by implementing like processings, a right overtaking accuracy amount αR1 is calculated by the like determination based on the information of the right obstacle SM with respect to the own vehicle MM. As mentioned above, when it is determined at step S50 that the possibility that the overtaking state is established is high, whether or not the overtaking state is established is determined based on the overtaking state accuracy at step S55, to thereby accurately determine that the overtaking state is established.

Herein, when a state that the overtaking accuracy amount αL1 (αR1) showing the detection accuracy of the overtaking state becomes less than or equal to the certain overtaking detection threshold (<1) (a state in a process of detecting the overtaking state) continues for a certain time, the flag F_Overtake showing the determination of the overtaking state is set to "1." Otherwise, when the overtaking accuracy amount αL1 (αR1) showing the detection accuracy of the overtaking state becomes less than or equal to the certain overtaking detection threshold (<1) (detecting that the overtaking state is established), the flag F_Overtake showing the determination of the overtaking state may be set to "1" without waiting for a continuation of the certain time. According to the first embodiment, for more assuredly detecting that the overtaking state has been established, it is necessary to determine whether or not the overtaking state has continued for the certain time. In addition, when a non-overtaking state is established, the flag F_Overtake showing the determination of the overtaking state is set to "0."

Herein, for calculating the overtaking accuracy amount αL1 (αR1) at step S55, it is exemplified that all of the relative distance Dist, the relative speed Relvsp and the detection angle Angle are used. Otherwise, the overtaking accuracy amount αL1 (αR1) may be calculated by one or two of these three pieces of the obstacle information.

In addition, the determination of the overtaking state at step S55 may be made through the following processings.

That is, a determination flag F_ObstFront2Rear is set. When the obstacle SM as target moves from the forward direction of the own vehicle MM to the sideward or rearward direction of the own vehicle MM, the determination flag F_ObstFront2Rear is set to "1" until the obstacle SM is away from a recognition range. Then, the following operation is allowed: when the determination flag F_ObstFront2Rear is 1 and the overtaking accuracy amount αL1 (αR1) becomes less than or equal to the determination threshold of the overtaking state, the overtaking state is determined to be established, to thereby set the flag F_Overtake (showing the determination of the overtaking state) to 1. This makes it possible to more accurately determine that the overtaking state is established.

In addition, the flag F_Overtake showing the determination of the overtaking state is reset to "0" when αL1 (αR1) becomes over the determination threshold of the overtaking state (not in a state of detecting the overtaking state). The threshold of the αL1 (αR1) which is used when the flag F_Overtake showing the determination of the overtaking state is reset to "0" may have a hysteresis in a direction where the flag F_Overtake is less likely to be cancelled. That is, a cancellation-purpose threshold is set higher than the threshold for determining that the overtaking state is established. Moreover, the following operation is allowed: when the flag F_Overtake showing the determination of the overtaking state is once set, the flag F_Overtake is set to "0" in a situation that the target object is not detected.

Moreover, after the flag F_Overtake showing the determination of the overtaking state is once set to "1," the flag F_Overtake is maintained for a certain time and then is cleared (set to "0"). Herein, the certain time for clearing the flag F_Overtake may be i) simply a time or ii) a time from the time point of detecting the overtaking state to the time point when the travel distance of the own vehicle MM becomes a certain distance set in advance. That is, in a condition that the travel distance from the time point of detecting the overtaking state becomes more than or equal to the certain distance set in advance, the flag F_Overtake may be cleared. Otherwise, for example, the above certain time may be a time until the relative distance between the own vehicle MM and the obstacle SM becomes more than the certain distance. The above certain time can be properly varied.

<Step S60>

Then, at step S60, detection is made whether or not the intension of lane change operation (by the driver) to the obstacle SM side is present.

According to the first embodiment, based on the information of the steering operation and accelerator operation by the driver, the determination is made whether or not the driver has an intension of the lane change operation toward the left obstacle SM. For example, as stated hereinafter, through the increased steering angle δ, steering angular speed Dδ, accelerator depression amount θt (or accelerator opening θt), and direction switch signal (turn signal) of the own vehicle MM, a lane change detection accuracy amount αL2 (by the driver) in the direction to the left obstacle SM is calculated. Herein, the increased steering angle δ can be calculated by the steering angle (δ) information from the steering angle sensor 19. The steering angular speed D6 can be calculated by differentiating the steering angle (δ) information from the steering angle sensor 19. The accelerator depression amount θt can be calculated by the accelerator opening (θt) information from the accelerator opening sensor 18.

Then, the left lane change detection accuracy amount αL2 is calculated by the following expression.

$$\alpha L2 = Kt(\text{direction switch signal}) \times Ks(\delta) \times KDs(D\delta) \times KAc(\theta t)$$

Figure 6:
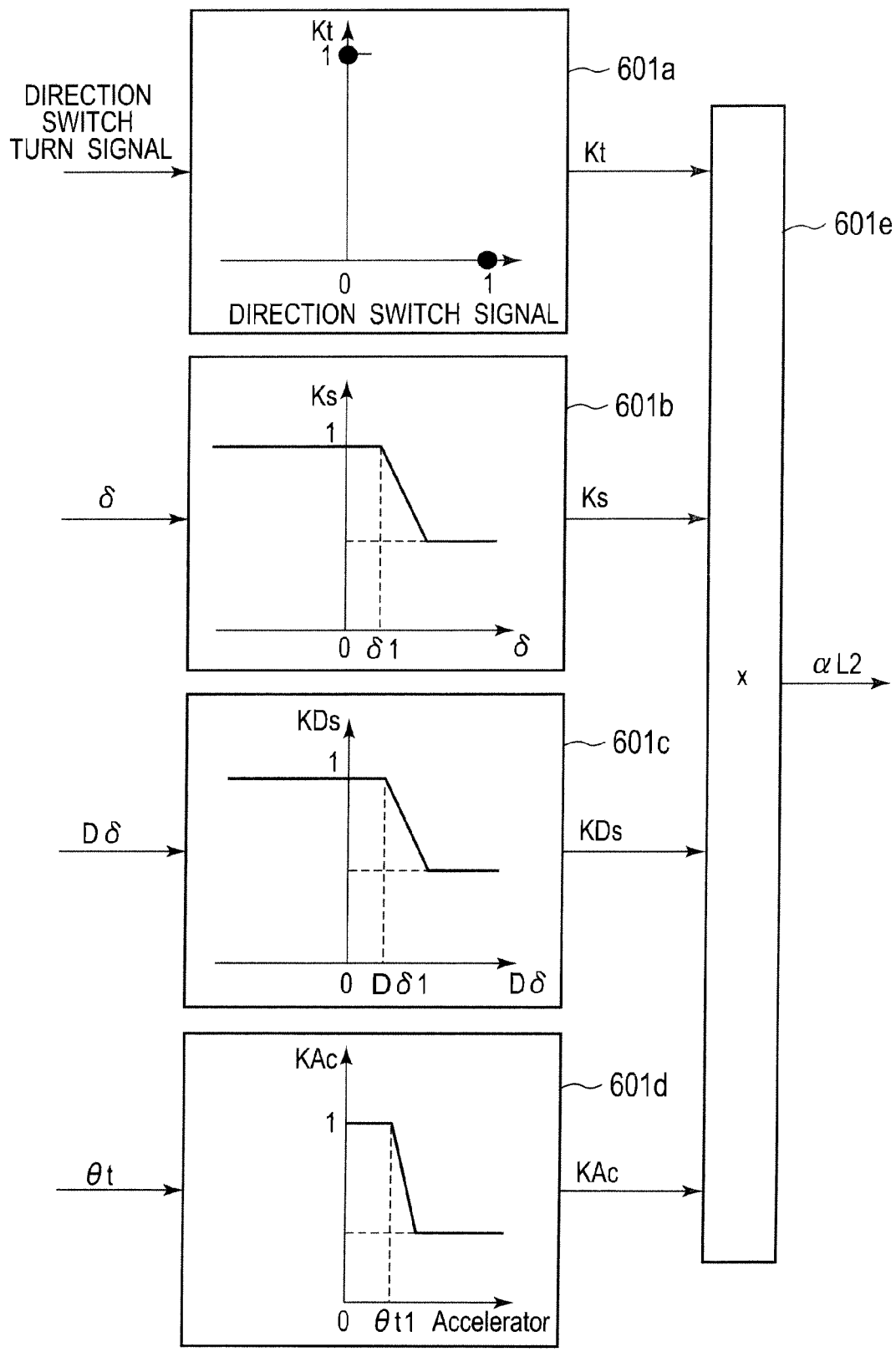
FIG. 6 is a block diagram showing a concept of calculation of a left lane change detection accuracy amount in a direction of a left obstacle.

The calculation processing of the left lane change detection accuracy amount αL2 is set forth referring to FIG. 6.

FIG. 6 is a block diagram showing the concept of calculation of the left lane change detection accuracy amount αL2.

Based on the direction switch signal, a first lane change detection accuracy amount calculator 601a calculates a first lane change detection accuracy amount Kt by referring to a first lane change detection accuracy amount calculation map.

Herein, when the direction switch signal for changing the lane to left is not present, the first lane change detection accuracy amount calculation map sets the first lane change detection accuracy amount Kt=1, while when the direction switch signal for changing the lane to left is detected, the first lane change detection accuracy amount calculation map sets the first lane change detection accuracy amount Kt=0.

Based on the steering angle δ, a second lane change detection accuracy amount calculator 601b calculates a second lane change detection accuracy amount Ks by referring to a second lane change detection accuracy amount calculation map.

Herein, the second lane change detection accuracy amount calculation map has an ordinate representing the second lane change detection accuracy amount Ks and an abscissa representing the steering angle δ. Then, the second lane change detection accuracy amount calculation map is so set that Ks=1 is satisfied when the steering angle δ is less than or equal to its determination threshold 61 and then, in the region over the determination threshold δ1, the larger the steering angle δ is the smaller the second lane change detection accuracy amount Ks is.

Based on the steering angular speed Dδ, a third lane change detection accuracy amount calculator 601c calculates a third lane change detection accuracy amount KDs by referring to a third lane change detection accuracy amount calculation map.

Herein, the third lane change detection accuracy amount calculation map has an ordinate representing the third lane change detection accuracy amount KDs and an abscissa representing the steering angular speed Dδ. Then, the third lane change detection accuracy amount calculation map is so set that KDs=1 is satisfied when the steering angular speed Dδ is less than or equal to its determination threshold Dδ1 and then, in the region over the determination threshold Dδ1, the larger the steering angular speed Dδ is, the smaller the third lane change detection accuracy amount KDs is.

Based on the accelerator depression amount θt, a fourth lane change detection accuracy amount calculator 601d calculates a fourth lane change detection accuracy amount KAc by referring to a fourth lane change detection accuracy amount calculation map.

Herein, the fourth lane change detection accuracy amount calculation map has an ordinate representing a fourth lane change detection accuracy amount KAc and an abscissa representing the accelerator depression amount θt. Then, the fourth lane change detection accuracy amount calculation map is so set that KAc=1 is satisfied when the accelerator depression amount θt is less than or equal to its determination threshold θt1 and then, in the region over the determination threshold θt1, the larger the accelerator depression amount θt is the smaller fourth lane change detection accuracy amount KAc is.

In addition, though not shown in FIG. 6, the following operation is allowed: providing a fifth lane change detection accuracy amount calculator, and calculating a fifth lane change detection accuracy amount based on the accelerator depression speed by referring to a fifth lane change detection accuracy amount calculation map. This fifth lane change detection accuracy amount calculation map has an ordinate representing the fifth lane change detection accuracy amount and an abscissa representing the accelerator depression speed. Then, the fifth lane change detection accuracy amount calculation map is so set that the fifth lane change detection accuracy amount=1 is satisfied when the accelerator depression speed is less than or equal to its determination threshold and then in the region over the determination threshold of the accelerator depression speed, the larger the accelerator depression speed is the smaller the fifth lane change detection accuracy amount is.

In addition, each of the second to fifth lane change detection accuracy amounts is set to have a lower limit (>0).

A lane change detection accuracy amount output 601e receives (input) the first to fourth lane change detection accuracy amounts Kt, Ks, KDs and KAc and outputs the final lane change detection accuracy amount αL2. Herein, the first to fourth lane change detection accuracy amounts Kt, Ks, KDs and KAc are multiplied, to thereby calculate the lane change detection accuracy amount αL2. That is, the lane change detection accuracy amount αL2 is calculated by the following expression.

$$\alpha L2 = Kt \times Ks \times KDs \times KAc$$

In addition, the lane change detection accuracy amount αL2 may be calculated according to any one of a steering angle increment obtained from when the overtaking state is determined to be established and the accelerator depression amount increment obtained from when the overtaking state is determined to be established.

Herein, as the increased steering angle δ, for example, the following difference may be used: (δ=str_filt_light−str_filt_heavy) which is calculated based on a steering angle str_filt_heavy obtained by subjecting the steering angle information to a filter having a large time constant and a steering angle str_filt_light obtained by subjecting the steering angle information to a filter having a small time constant. The increased steering angle δ thus obtained is calculated as an increased steering angle to which the steering angular speed is applied.

Then, in terms of the accelerator depression amount, an increased accelerator depression amount is determined as the difference which is obtained by (θt_filt_heavy−θt_filt_light), where the information θt_filt_heavy is obtained by subjecting the accelerator opening information to a filter having a large time constant and the information θt_filt_light is obtained by subjecting the accelerator opening information to a filter having a small time constant. The accelerator depression amount thus obtained is calculated as an accelerator depression amount to which an increased accelerator depression speed is also applied. In addition, by detecting the accelerator depression speed in place of the accelerator opening, whether or not the intention of lane change operation is present may be detected by the accelerator depression speed.

In addition, when the steering angular speed information or the accelerator depression speed information is used, such values are each detected as a momentary value. Therefore, the maximum of the thus detected value should be kept for a certain time (for example, 1 second).

In addition, a lane change detection accuracy amount αL2 in the direction of the right obstacle is calculated by a like determination.

In the above description, the final lane change detection accuracy amount αL2 (αR2) is obtained by a product of map values which were acquired by the direction switch signal, information of steering angle δ, information of steering angular speed Dδ, information of accelerator depression amount θt. However, select-low of these may be used for obtaining the lane change detection accuracy amount αL2 (αR2). Otherwise, the lane change detection accuracy amount αL2 may be calculated by using one or two or three of the first to fourth lane change detection accuracy amounts Kt, Ks, KDs and KAc. That is, the lane change detection accuracy amount αL2 may be anything which meets the following condition: the accuracy becomes larger (αL2 becomes smaller) when the driver implements the steering operation with an intention of lane change or when the driver implements the accelerator operation and the like with an intention of lane change.

Then, when the lane change detection accuracy amount αL2 (αR2) becomes less than or equal to a certain determination threshold for lane change (<1), it is determined that detection that the driver has the lane change intension has been made. When the lane change intention is detected, the flag F_driverovertake_intention is set to "1." When the lane change detection accuracy amount αL2 (αR2) becomes over the certain determination threshold for lane change (setting hysteresis is preferable), the flag F_driverovertake_intention is set to "0." That is, as a condition for resetting the flag F_driverovertake_intention to "0," it should be detected that the lane change detection accuracy amount αL2 (αR2) becomes less than or equal to a certain threshold (hysteresis is set to the threshold so that the flag F_driverovertake_intention is unlikely to be cancelled).

Then, when F_driverovertake_intention is "0," F_Overtake is overwritten with "0" even when the F_Overtake is "1."

The processing at this step S60 may be omitted.

<Step S70>

Then, at step S70, the braking-driving force control unit 8 calculates a neutral yaw rate $\phi'_{path}$ based on the following expression (3). The neutral yaw rate $\phi'_{path}$ is necessary for the own vehicle MM to keep the travel along the travel road. The neutral yaw rate $\phi'_{path}$ becomes zero when the own vehicle MM is driving on a straight road. In a curved road, however, the neutral yaw rate $\phi'_{path}$ will change depending on the curvature β of the curved road. Thus, the curvature β of the travel lane is used for calculating the neutral yaw rate $\phi'_{path}$.

$$\phi'_{path} = \beta \cdot V \quad (3)$$

Herein, the neutral yaw rate $\phi'_{path}$ for the own vehicle MM to keep the travel route may be obtained by using an average $\phi'_{ave}$ of the neutral yaw rate $\phi'_{path}$ for a certain period or by simply calculating a value which is acquired by subjecting a neutral yaw rate $\phi'_{path}$ to a filter having a large time constant.

<Step S80>

At step S80, the braking-driving force control unit 8 sets the forward watching time Tt. The forward watching time Tt is a certain time for determining the threshold for estimating a situation that the driver approaches the obstacle in the future. For example, the forward watching time Tt is set to 1 second.

Then, a target yaw rate $\psi_{driver}$ and a correction target yaw rate $\psi_{drivercorrection}$ are calculated.

The target yaw rate $\psi_{driver}$ is calculated from the steering angle δ and vehicle speed V as shown by the following expression (4). This target yaw rate $\psi_{driver}$ is a yaw rate that is to be caused by the driver's steering operation. That is, the target yaw rate $\psi_{driver}$ signifies a yaw rate intentionally caused by the driver.

$$\psi_{driver} = Kv \cdot \delta \cdot V \quad (4)$$

Herein, Kv denotes a gain predetermined according to the specifications and the like of the vehicle.

Moreover, the correction target yaw rate $\psi_{drivercorrection}$ is calculated by the following expression (5). This correction target yaw rate $\psi_{drivercorrection}$ is obtained by subtracting the neutral yaw rate $\phi'_{path}$ (necessary for traveling the travel road) from the target yaw rate $\psi_{driver}$. By this operation, an influence caused by the steering operation for traveling the curved road is deleted from the target yaw rate $\psi_{driver}$.

$$\psi_{drivercorrection} = \psi_{driver} - \phi'_{path} \quad (5)$$

That is, the correction target yaw rate $\psi_{drivercorrection}$ is a deviation of a yaw rate necessary for traveling along the travel road (neutral yaw rate $\phi'_{path}$) from a yaw rate caused by the driver's steering operation (target yaw rate $\psi_{driver}$). In addition, the correction target yaw rate $\psi_{drivercorrection}$ is in accordance with the driver's lane change intention.

<Step S90>

Then, at step S90, by using the forward watching time Tt set at the above step S80 and based on the following expression (6), the braking-driving force control unit 8 calculates the own vehicle estimated position ΔXb which is the own vehicle MM's lateral position after the forward watching time Tt relative to the current own vehicle MM' lateral position of (position in the travel road widthwise direction). That is, the lateral distance (distance in a widthwise direction of travel road) to a lateral position 150 of the own vehicle MM after the forward watching time Tt from the lateral position of the current own vehicle MM is calculated as the own vehicle estimated position ΔXb. In addition, the own vehicle estimated position ΔXb is used for determining whether or not the prevention control relative to the obstacle SM should be started, as described afterward.

$$\Delta Xb = (K1 \cdot \phi f + K2 \cdot \phi m + K3 \cdot \phi m') \quad (6)$$

where
$\phi f$: yaw angle
$\phi m$: target yaw angular speed
$\phi m'$: target yaw angular acceleration Moreover, the target yaw angular speed $\phi m$ is given by the following expression (7).

$$\phi m = \psi_{drivercorrection} \cdot Tt \quad (7)$$

Moreover, the target yaw angular acceleration $\phi m'$ is given by the following expression (8).

$$\phi m' = \phi m \cdot Tt^2 \quad (8)$$

where, for rendering the own vehicle estimated position ΔXb into the dimension of the yaw angle, a forward watching distance L is used to thereby give the following expression (9).

$$\Delta Xb = L \cdot (K1 \phi f + K2 \phi m \cdot Tt + K3 \phi m' \cdot Tt^2) \quad (9)$$

where the forward watching distance L and the forward watching time Tt satisfy the following expression (10).

Forward watching distance L=Forward watching time Tt·vehicle speed V    (10)

In view of the above characteristics, the set gain K1 is a value with the vehicle speed V as a function. Moreover, the set gain K2 is a value with the vehicle speed V and forward watching time Tt as a function. The set gain K3 is a value with the vehicle speed V and the second power of forward watching time Tt as a function.

In addition, the estimated position of the own vehicle MM may be calculated by individually calculating the steering angle component and steering angular speed component and then making a select-high of these, as shown by the following expression (11).

$$\Delta Xb = \max(K2\phi m, K3f\phi m') \quad (11)$$

<Step S100>

Then, at step S100, the braking-driving force control unit 8 sets a determination threshold for control start. This determination threshold determines whether or not the prevention control relative to the posterolateral obstacle SM is started. Herein, based on the lateral position of each of the own vehicle MM and obstacle SM after the forward watching time Tt, this start determination of the prevention control at step S100 determines whether or not it is possible that the own vehicle MM enters the path of the obstacle SM after the forward watching time Tt. Even when it is determined at step S100 that the prevention control will be started, such prevention control is not necessarily be actually started. Whether or not the prevention control is actually started is determined at an after-described step S115.

Figure 7:
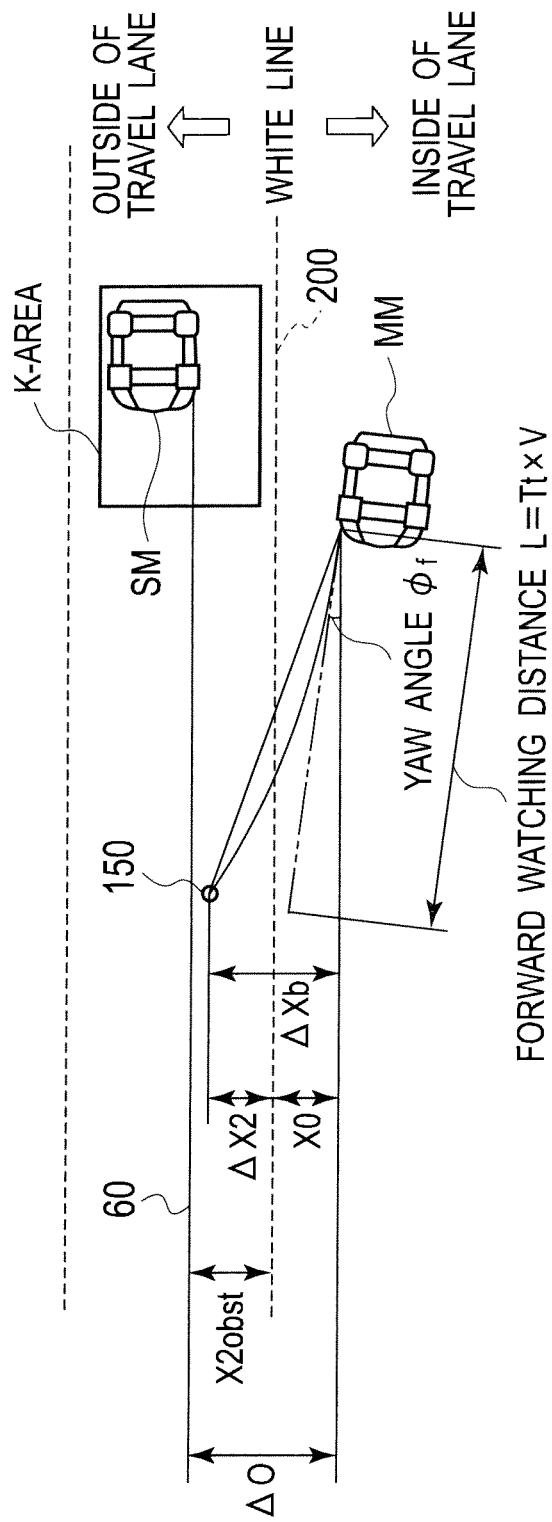
FIG. 7 is a conceptual diagram showing a relation between the own vehicle and the obstacle.

According to the first embodiment, with $\Delta O$ in FIG. 7 as the above determination threshold, the start of the prevention control is determined based on this determination threshold $\Delta O$ and the own vehicle estimated position $\Delta Xb$. $\Delta O$ is a lateral relative distance between the own vehicle MM and the obstacle SM, which distance was detected by the radar devices 24L/24R.

Moreover, when the lateral relative distance $\Delta O$ between the own vehicle MM and the obstacle SM cannot be accurately calculated, an obstacle distance X2$obst$ as a certain distance is used to thereby set the above determination threshold. The obstacle distance X2$obst$ is equivalent to a lateral distance to the white line 200 from a certain imaginary position (position in the lane widthwise direction) where the obstacle SM is present.

The obstacle distance X2$obst$ becomes 0 when the certain imaginary position (position in the lane widthwise direction) where the obstacle SM is present is defined as the white line 200, becomes positive when being outside the white line 200 and becomes negative when being inside the white line 200. That is, the above determination threshold is set in such a manner that a lateral displacement X0 of the own vehicle MM added by the obstacle distance X2$obst$ in FIG. 7 is defined as an imaginary distance from the own vehicle MM to the obstacle SM. Herein, the lateral displacement X0 in FIG. 7 is equivalent to the lateral displacement Xf detected by the above-described image pickup portion 13.

Moreover, a certain threshold Xthresh may be set as the above determination threshold. This certain threshold Xthresh is obtained by setting in advance how far the own vehicle future position (own vehicle estimated position $\Delta Xb$) is away from the current position. When the own vehicle estimated position $\Delta Xb$ becomes larger than the certain threshold Xthresh, the driver is making an excessively large steering operation, thereby making it possible to determine that the own vehicle MM will enter the path of the obstacle SM after the forward watching time Tt. Thus, the threshold Xthresh is set to such a large value as to assuredly detect that the driver of the own vehicle MM has an intention of lane change.

Herein, an X-Y coordinate system where a Y-axis is taken in a direction along the travel road and an X-axis is taken in a direction perpendicular to the travel road, that is, the lane widthwise direction is used. Then, the lateral position of the obstacle SM is detected on the X-axis. Based on the lateral position, the lateral relative distance $\Delta O$ is obtained.

In addition, the obstacle detection area K-AREA set as an area for detecting the obstacle SM is so set as to be a certain longitudinal-lateral position in posterolateral direction of the own vehicle MM. Moreover, the longitudinal position may be so set that the larger the relative speed Relvsp (obstacle SM approaching the own vehicle MM) is, the larger the obstacle detection area K-AREA is.

<Step S110>

Then, at step S110, the braking-driving force control unit 8 determines whether or not the own vehicle MM is approaching the posterolateral obstacle SM. Herein, the determination of the control start is to set the obstacle approach prevention control determination flag Fout_obst based on the positional relation between the own vehicle MM and the obstacle SM. Whether or not to actually start the control is determined based on the determination result at an after-described step S115.

At step S110, when the following expression (12) is satisfied (start condition 1), it is determined that the control start is established.

$$\Delta Xb \geq \Delta O \quad (12)$$

Herein, the own vehicle estimated position $\Delta Xb$ relative to the lateral relative distance $\Delta O$ denotes an approaching degree to the obstacle SM. That is, this is synonymous with the following occasion: in the lane widthwise direction, setting the obstacle SM's position as the determination position of the control start (control start position 60), and then determining that the control start is established when the own vehicle future position (forward watching point 150) after the forward watching time Tt is outside the control start position 60 in the lane widthwise direction. In addition, the position inside in the lane widthwise direction by a certain distance from the obstacle SM's position may be defined as the determination position of the control start (control start position 60). In this case, the lateral relative distance $\Delta O$ may be corrected by subtracting the certain distance from the lateral relative distance $\Delta O$.

Then, with the obstacle distance X2$obst$ used as the determination threshold for control start, when the following expression (13) is satisfied (start condition 2) it is determined that the control start is established.

$$\Delta X2 = \Delta Xb - \Delta X0 \geq X2obst \quad (13)$$

That is, as shown in FIG. 7, it is determined whether or not the lateral distance $\Delta X2$ between the white line 200 and the own vehicle MM's future estimated position (forward watching point 150) after the forward watching time Tt is more than or equal to the obstacle distance X2$obst$. That is, it is determined whether or not the own vehicle MM's lateral position (forward watching point 150) after the forward watching time Tt is more outside (in the lane widthwise direction) than the obstacle distance X2$obst$'s certain position with respect to the white line 200. Then, when the radar devices 24L/24R detect that the obstacle SM is present in the obstacle detection area K-AREA and the above start condition 2 is satisfied, it is determined that the control with respect to the obstacle SM is started. When the control with respect to the obstacle SM is determined to be started, the obstacle approach prevention control determination flag Fout_obst is set to ON. On the other hand, when the above condition is not satisfied, the obstacle approach prevention control determination flag Fout_obst is set to OFF.

Moreover, the threshold Xthresh may be used as the determination threshold for control start. In this case, when the radar devices 24L/24R detect that the obstacle SM is present in the obstacle detection area K-AREA and the following expression (14) is satisfied (start condition 3), it is determined that the control start is established.

$$\Delta Xb \geq Xthresh \quad (14)$$

Herein, the own vehicle estimated position $\Delta Xb$ is actually calculated for each of the left and right sides of the own vehicle MM respectively as $\Delta XbL/\Delta XbR$, to thereby make individual determinations.

Moreover, the obstacle SM as control target may include, not only the vehicle in the posterolateral direction of the own vehicle MM, but also an opposing vehicle in the forward direction of an adjacent lane.

Herein, when it is determined whether or not the own vehicle estimated position ΔXb is less than the determination threshold, a hysteresis equivalent to F can be provided as denoted by ΔXb<ΔO−F. That is, a dead zone may be set. More specifically, the dead zone may be set between a control intervention threshold and a control end threshold.

Moreover, the obstacle approach prevention control determination flag Fout_obst can be set to ON when the Fout_obst is OFF. Moreover, as a condition for making the Fout_obst made settable to ON, a time-related condition may be added, for example, after an elapse of a certain time after the Fout_obst is set to OFF. Moreover, after an elapse of a certain time Tcontrol after the determination that the Fout_obst is ON is made, the control may be ended by making Fout_obst=OFF.

Moreover, when the obstacle approach prevention control is being implemented, an implementation direction Dout_obst of control is determined according to the determination direction of the future estimated position (forward watching point 150). When the future estimated position (forward watching point 150) is left, Dout_obst=LEFT, while when the future estimated position is right, Dout_obst=RIGHT.

Herein, when the antiskid control (ABS), traction control (TCS) or vehicle dynamics control unit (VDC) is in operation, the obstacle approach prevention control determination flag Fout_obst is set to OFF. This is for making the obstacle approach prevention control inoperable when the automatic braking control implemented irrespective of the driver's operation is in operation.

<Step S115>

Then, at step S115, based on the obstacle approach prevention control determination flag Fout_obst and the flag F_Overtake which shows the determination of the overtaking state, whether or not to implement the obstacle approach prevention control is determined.

When the obstacle approach prevention control determination flag Fout_obst is ON and F_Overtake=0, it is determined that the own vehicle MM is approaching the obstacle SM, to thereby keep the obstacle approach prevention control determination flag Fout_obst to ON.

On the other hand, when the obstacle approach prevention control determination Fout_obst is ON and F_Overtake=1, it is determined that the own vehicle MM has overtaken the obstacle SM and the driver has the lane change intention, to thereby reset the obstacle approach prevention control determination flag Fout_obst to OFF.

Moreover, when the obstacle approach prevention control determination flag Fout_obst is OFF, the obstacle approach prevention control determination flag Fout_obst is kept at OFF irrespective of F_Overtake.

That is, as stated above, the flag F_Overtake showing the determination of the overtaking state is set to "1" only when it is determined that the own vehicle MM has overtaken the obstacle SM and that the driver of the own vehicle MM has the lane change intention. Thus, when F_Overtake=1, it is estimated that the driver has an intention of lane change while recognizing the obstacle SM. Therefore, in this case, even when the obstacle approach prevention control determination flag Fout_obst is ON, the obstacle approach prevention control determination flag Fout_obst is reset to OFF so as not to implement (so as to suppress) the obstacle approach prevention control.

On the other hand, when the flag F_Overtake showing the determination of the overtaking state is set to "0," the following first and second states are made: a first state where the own vehicle MM has not overtaken the obstacle SM and a second state where the own vehicle MM has overtaken the obstacle SM and the driver has no lane change intention. Thus, when F_Overtake=0 and the obstacle approach prevention control determination flag Fout_obst is ON, it is estimated that the driver is approaching the obstacle SM without recognizing the obstacle SM or even if the driver recognizes the obstacle SM, the own vehicle MM is approaching the obstacle SM without the driver's lane change intention. Therefore, in this case, the obstacle approach prevention control determination flag Fout_obst is kept ON, to thereby implement the obstacle approach prevention control.

In addition, when F_Overtake=1, the following operation is also allowed: the obstacle approach prevention control determination flag Fout_obst is set to OFF so that the obstacle approach prevention control is not implemented based only on the state of F_Overtake.

<Step S120>

Then, at step S120, processings of alarming are implemented. That is, when it is determined that the obstacle approach prevention control determination flag Fout_obst is ON, an alarming sound is generated. The alarming is not limited to the alarming sound, otherwise may be implemented by a lamp or a seat vibration.

Herein, the alarming may be implemented earlier than when the forward watching point 150 based on the forward watching time Tt (lateral position of the own vehicle MM after the forward watching time Tt) reaches the position of control start. That is, the forward watching time Tt is multiplied by a certain gain Kbuzz (>1) so that the time is longer than the forward watching time Tt. Then, by using the forward watching point 150 based on (Tt×Kbuzz), the alarming may be generated when it is determined that the forward watching point 150 calculated based on the expression (6) has reached the determination threshold. Otherwise, when it is determined that the operation of the obstacle approach prevention control is started, the alarming may be caused to thereby start control after an elapse of a certain time. Still otherwise, the alarming may be generated in conjunction with a state where the control output is simply implemented.

<Step S130>

Then, at step S130, the braking-driving force control unit 8 sets the target yaw moment Ms.

When the obstacle approach prevention control determination flag Fout_obst is OFF, the target yaw moment Ms is set to 0. Then, the process moves to step S140.

On the other hand, when the obstacle approach prevention control determination flag Fout_obst is ON, the target yaw moment Ms is calculated by the following expression (18). Then, the process moves to step S140.

$$Ms = K1recv \cdot K2recv \cdot \Delta Xs \quad (18)$$

$$\Delta Xs = (K1mon \cdot \phi f + K2mon \cdot \phi m)$$

Herein, K1$recv$ is a proportional gain determined from the vehicle's specifications (yaw inertia moment). K2$recv$ is a gain which is variable in accordance with the vehicle speed V. The gain K2$recv$ is set, for example, so that the gain K2$recv$ becomes larger in a lower speed region, becomes inversely proportional to the vehicle speed V when the vehicle speed V reaches a certain value, and thereafter becomes constant at a small value after the vehicle speed V reaches a certain value. The set gain K1$mon$ is a value with the vehicle speed V as a function. The set gain K2$mon$ is a value with the vehicle speed V and forward watching time Tt as a function.

According to the expression (18), as the steadily-generated yaw rate becomes larger by the yaw angle φf relative to the white line 200 or by the increased steering operation by the driver, the target yaw moment Ms becomes larger.

Otherwise, the target yaw moment Ms may be calculated from the following expression (19). The expression (19) is synonymous with multiplying the expression (18) by the set gain K3 ($=1/Tt^2$). The larger the forward watching time Tt is, the smaller the set gain K3 is.

$$Ms = K1recv \cdot \Delta Xb/(L \cdot Tt^2) \quad (19)$$

The use of the above expression (19) makes the following result. That is, the shorter the forward watching time Tt is, the stronger the control amount is. That is, setting the forward watching time Tt such that the control start timing is delayed will enlarge the control amount at the control start. Moreover, setting the forward watching time Tt such that the control start timing is prompted will lessen the control amount. As a result, the control amount is so set to the driver as to accord with the setting of the forward watching point 150, thus making it possible to implement the control which is along the situation and has little discomfort.

In addition, the determination of the above Fout_obst estimates the future lane change based on the steering information.

Herein, the following operation is allowed. Other than this obstacle approach prevention control, in a case that a lane deviation prevention control for controlling the behavior of the own vehicle MM in such a manner as to prevent the lane deviation when the own vehicle MM has a possibility of making lane deviation, the control started earlier {that is, any one of this obstacle approach prevention control and the lane deviation prevention control (Fout_LDP=1)} is prioritized, and the other control is so made as not to be implemented until the earlier control is ended.

<Step S140>

At step S140, the braking-driving force control unit 8 calculates a command for causing the target yaw moment Ms for preventing the obstacle SM, and then outputs the command. Then, the process returns to the initial processing.

Herein, according to the first embodiment, as a measure for causing the target yaw moment Ms for preventing the obstacle SM, an example will be made in a case that the yaw moment is caused by using a braking-driving force, as described below.

When a steering reactive force controller is used as a measure for causing the yaw moment, the braking-driving force control unit 8 may calculate a steering reactive force Fstr (Fstr=Ka·Ms) as a command for causing the target yaw moment Ms, and output the steering reactive force Fstr to the steering reactive force controller to thereby cause the reactive force. Herein, Ka denotes a coefficient obtained in advance through experiments and the like and converts the yaw moment into the steering reactive force.

Moreover, when a steering angle controller is used as a measure for causing the yaw moment, the braking-driving force control unit 8 may calculate a steering angle STRθ (STRθ=Kb·Ms) as a command for causing the target yaw moment Ms and output the steering angle STRθ to the steering angle controller to thereby control the steering angle. Herein, Kb denotes a coefficient obtained in advance through experiments and the like and converts the yaw moment into the steering angle.

Moreover, when a steering force controller such as a power steering and the like is used as a measure for causing the yaw moment, the braking-driving force control unit 8 may calculate the steering force (steering torque) (STRtrg=Kc·Ms) as a command for causing the target yaw moment Ms and may output the steering force to the steering force controller to thereby control the steering force. Herein, Kc denotes a coefficient obtained in advance through experiments and the like and converts the yaw moment into the steering angle.

According to the first embodiment, in the case that a braking force difference between the right and left wheels of the vehicle is caused as a measure for causing the yaw moment, the braking-driving force control unit 8 calculates a command for causing the yaw moment Ms, as stated below.

When the target yaw moment Ms is 0, that is, when the yaw moment control is not implemented, the brake fluid pressures (pressure of brake fluid) Pmf, Pmr as target brake fluid pressure Psi (i=fl, fr, rl, n) of each wheel are outputted to the brake fluid pressure controller 7, as shown in the following expressions (20) and (21). With this, the brake fluid pressure controller 7 controls the fluid pressure circuit 30, to thereby control the brake fluid pressure of each wheel to the target brake fluid pressure Psi (i=fl, fr, rl, rr).

$$Psfl = Psfr = Pmf \quad (20)$$

$$Psrl = Psrr = Pmr \quad (21)$$

Herein, Pmf denotes a brake fluid pressure for the front wheel. Pmr denotes a brake fluid pressure for the rear wheel and is a value calculated based on the brake fluid pressure Pmf for the front wheel in view of front-to-rear allocation. For example, when the driver is making a braking operation, the brake fluid pressures Pmf, Pmr become values in accordance with the operation amount (master cylinder fluid pressure Pm) of the braking operation.

On the other hand, when an absolute value of the target yaw moment Ms is larger than 0, that is, when the obstacle approach prevention control is implemented, the following processings are implemented.

Specifically, based on the target yaw moment Ms, a front wheel target brake fluid pressure difference ΔPsf and a rear wheel target brake fluid pressure difference ΔPsr are calculated. More specifically, the target brake fluid pressure differences ΔPsf, ΔPsr are respectively calculated by the following expressions (22) and (23).

$$\Delta Psf = 2 \cdot Kbf \cdot (Ms \cdot FRratio)/Tr \quad (22)$$

$$\Delta Psr = 2 \cdot Kbr \cdot (Ms \times (1-FRratio))/Tr \quad (23)$$

Herein, FR ratio denotes a setting threshold, Tr denotes a tread, and Kbf and Kbr denote conversion coefficients of the front and rear wheels for converting the braking force into the brake fluid pressure.

In addition, herein for convenience sake, the tread Tr has the same value for front and rear. Moreover, Kbf, Kbr are each a coefficient which is predetermined by brake specifications.

In this way, the braking forces caused to the wheels are allocated according to the measure of the target yaw moment Ms. That is, a certain value is given to each of the target brake fluid pressure differences ΔPsf, ΔPsr, to thereby cause the braking force difference between the right and left wheels on front and rear. Then, the thus calculated target brake fluid pressure differences ΔPsf, ΔPsr are used, to thereby calculate the final target brake fluid pressure Psi (i=fl, fr, rl, rr) of each wheel.

Specifically, when the implementation direction Dout_obst of control is LEFT, that is, in the case where the obstacle approach prevention control with respect to the left obstacle SM is implemented, the target brake fluid pressure Psi (i=fl, fr, rl, rr) of each wheel is calculated by the following expression (24).

$$Psfl=Pmf,$$

$$Psfr=Pmf+\Delta Psf,$$

$$Psrl=Pmr,$$

$$Psrr=Pmr+\Delta Psr \quad (24)$$

On the other hand, when the implementation direction Dout_obst of control is RIGHT, that is, in the case where the obstacle approach prevention control with respect to the right obstacle SM is implemented, the target brake fluid pressure Psi (i=fl, fr, rl, rr) of each wheel is calculated by the following expression (25).

$$Psfl=Pmf+\Delta Psf,$$

$$Psfr=Pmf,$$

$$Psrl=Pmr+\Delta Psr,$$

$$Psrr=Pmr \quad (25)$$

According to the above expressions (24) and (25), the braking-driving force difference between the right and left wheels is caused such that the braking force of the wheel on the side for preventing the obstacle (that is, the side opposite to a direction in which the obstacle SM is present) becomes larger than the braking force of the wheel on the obstacle SM side (that is, the side on which the obstacle SM is present).

Moreover, herein, as shown by the expressions (24) and (25), in view of the braking operation by the driver, that is, the brake fluid pressures Pmf, Pmr, the target brake fluid pressure Psi (i=fl, fr, rl, rr) of each wheel is calculated.

Then, to the brake fluid pressure controller 7, the braking-driving force control unit 8 outputs the thus calculated target brake fluid pressure Psi (i=fl, fr, rl, rr) of each wheel as brake fluid pressure command value. By this operation, the brake fluid pressure controller 7 controls the fluid pressure circuit 30, to thereby control the brake fluid pressure of each wheel to the target brake fluid pressure Psi (i=fl, fr, rl, rr).

(Operation)

Then, an example of the operation of the first embodiment will be explained.

Now, it is assumed that the own vehicle MM is traveling in parallel with the obstacle MM in the left rearward direction. In this case, the own vehicle MM is not in a state of overtaking the obstacle SM, thereby making the left overtaking accuracy amount αL1=1 (step S50). Thus, the flag F_Overtake showing the determination of the overtaking state is "0" (step S55).

Then, based on the yaw angle φf, target yaw angular speed φm, target yaw angular acceleration φm' and the like which denote the travel state of the own vehicle MM, the own vehicle estimated position ΔXb is calculated as the own vehicle future position after the forward watching time Tt (step S90). Then, the own vehicle MM moves toward the obstacle SM side by the driver's steering operation and the like, thereby the own vehicle estimated position ΔXb calculated by using the forward watching time (Tt·Kbuzz) for alarm becomes more than or equal to ΔO, to thereby alarm the driver (step S120). Moreover, when the driver fails to implement a path adjustment and the like of the own vehicle MM and the own vehicle estimated position ΔXb calculated by using the forward watching time Tt for control becomes more than or equal to ΔO, it is determined that the driving assist control for preventing the obstacle SM has started (step S110).

After the determination that the driving assist control is started is made, the target yaw moment Ms is calculated as control amount based on the own vehicle estimated position ΔXb (step S130). Then, the braking-driving force (brake fluid pressure) is so controlled as to cause the thus calculated target yaw moment Ms (step S140). By this, the own vehicle MM's behavior is controlled in the direction for preventing the approach to the obstacle SM (obstacle approach prevention control is implemented).

Thus, when the driver makes the steering operation in the direction for approaching the obstacle SM without recognizing the obstacle SM, the own vehicle MM's approach to the obstacle SM can be properly prevented.

Figure 8:
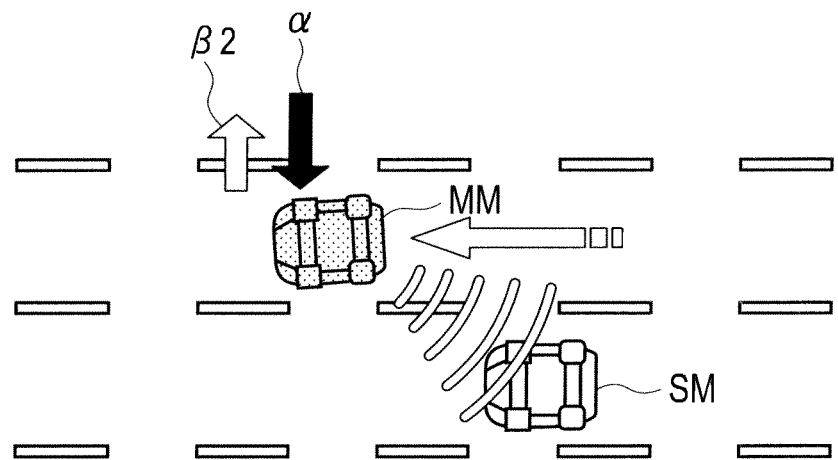
FIG. 8 is a diagram for explaining the operation according to the first embodiment of the present invention.

On the other hand, as shown in FIG. 8, after overtaking the obstacle SM, the driver makes a steering operation in the direction for approaching the obstacle SM. In this case, it is determined that the own vehicle MM is in a state of overtaking the obstacle SM, thus making the left overtaking accuracy amount αL1<1 (step S50). Moreover, the flag F_Overtake showing the determination (which is made based on the left overtaking accuracy amount αL1) of the overtaking state becomes "1" (step S55).

When the driver makes a steering operation to the obstacle SM (steering operation in the direction of α in FIG. 8) after overtaking the left obstacle SM, the own vehicle estimated position ΔXb calculated by using the forward watching time Tt for control becomes more than or equal to ΔO, thereby it is determined that the obstacle approach prevention control is started. However, since the overtaking state is established, the obstacle approach prevention control is not implemented as a suppression of start of the obstacle approach prevention control which prevents approach to the obstacle SM, according to the first embodiment.

As stated above, when it is detected that the own vehicle MM is in a state of overtaking the obstacle SM, the obstacle approach prevention control is not implemented. That is, when the detection that the own vehicle MM is in a state of overtaking the obstacle SM is made, start of the obstacle approach prevention control is suppressed compared with when such detection is not made. When the own vehicle MM is overtaking the obstacle SM, it is conceived that the driver recognizes the obstacle SM. Therefore, in such a case, suppressing the start of the obstacle approach prevention control can lower the driver's discomfort which is attributable to the following operations: when the driver recognizes the obstacle SM and changes the lane to a direction where the obstacle SM is present, the obstacle approach prevention control is sufficiently operated thereby the own vehicle MM is so controlled as to move away from the side obstacle SM.

Moreover, according to the first embodiment, the left lane change detection accuracy amount αL2 is calculated (step S60) as the detection of the lane change intention. Then, only when it is detected, based on the left lane change detection accuracy amount αL2, that the driver has the lane change intention, the processings are so implemented that the flag F_Overtake showing the determination of the overtaking state becomes "1."

As a result, only when it is detected that the driver intentionally makes lane change, start of the above control is suppressed. Due to this, the discomfort given to the driver can be more adequately relieved.

Herein, the radar devices 24L/24R are included in the side obstacle detector 50. Steps S100, S110, S120, S130 and S140 are included in operations implemented by the obstacle approach prevention controller 8B. Steps S50 and S55 are included in operations implemented by the overtaking state detector 8C. Step S60 is included in operations implemented by the change intention detector 8D. Step S115 is included in operations implemented by the control suppressor 8Ba.

Effect of First Embodiment (1) A side obstacle detector 50 detects an obstacle SM present in an obstacle detection area K-AREA, with at least a posterolateral direction of the own vehicle MM as the obstacle detection area K-AREA. An obstacle approach prevention controller 8B implements an obstacle approach prevention control which prevents the own vehicle MM from approaching the obstacle SM detected by the side obstacle detector 50. An overtaking state detector 8C, based on information of the obstacle SM with reference to the own vehicle MM, detects an overtaking state which is at least one of a first state where the own vehicle MM is overtaking the obstacle SM and a second state where the own vehicle MM is estimated to overtake the obstacle SM. A control suppressor 8Ba, when determination that the overtaking state is established is made based on the detecting by the overtaking state detector 8C, suppresses start of the obstacle approach prevention control compared with when the determination that the overtaking state is established is not made.

When the own vehicle MM approaches the obstacle SM to thereby satisfy the start condition of the obstacle approach prevention control in at least one of the first state where the own vehicle MM is overtaking the obstacle SM and the second state where the own vehicle MM is estimated to overtake the obstacle SM, it is assumed that the driver of the own vehicle MM has an intention of lane change to the obstacle SM side while recognizing the presence of the obstacle. In such a case, the start of the obstacle approach prevention control is suppressed, as a result, making it possible to suppress the driver's discomfort. That is, while the discomfort given to the driver is lowered, the driving assist control with respect to the obstacle SM present in the posterolateral direction of the own vehicle MM can be properly implemented.

(2) A change intention detector 8D detects whether or not the driver has the lane change intention. When the determination that the overtaking state is established is made based on the detection by the overtaking state detector 8C and the lane change intention is detected by the change intention detector 8D, the control suppressor 8Ba suppresses the start of the obstacle approach prevention control.

When the own vehicle MM has overtaken the obstacle SM, suppressing the start of the obstacle approach prevention control can suppress the driver's discomfort. In this case, only when it is detected that the driver intentionally makes the lane change, the start of the obstacle approach prevention control is suppressed. As a result, when the driver intentionally makes the lane change while recognizing the presence of the obstacle SM, the start of control is suppressed, thereby making it possible to more assuredly prevent the discomfort.

(3) The information of the obstacle SM with reference to the own vehicle MM includes at least one of a relative distance Dist, a relative speed Relvsp and a detection angle Angle of the obstacle SM relative to the own vehicle MM.

By this, without the need of using special devices such as inter-vehicular communication, infrastructure and the like, the first embodiment can be accomplished by a general vehicle-installable devices such as radar devices 24L/24R and the like.

(4) The obstacle approach prevention control by the obstacle approach prevention controller 8B implements at least one processing of causing to the own vehicle MM a yaw moment Ms in a direction away from the obstacle SM and alarming the driver that the own vehicle MM is approaching the obstacle SM.

By this, control of preventing the own vehicle MM from approaching the obstacle SM can be accomplished.

Modified Example (1) According to the first embodiment, the explanation has been made based on the following operations: detecting at step S50 the overtaking state of the own vehicle MM, then determining at step S55 that the overtaking state is established after an elapse of the certain time (constant time), and then suppressing the start of the obstacle approach prevention control.

In place of the above operations, the following operations are also allowed: detecting the overtaking state of the own vehicle MM, then determining that the overtaking state is established when the own vehicle MM travels by a certain distance (in other words, time for traveling the certain distance has elapsed), and then suppressing the start of the obstacle approach prevention control. In this case, based on the vehicle speed, it is determined, after an elapse of the certain time, that the overtaking state is established.

Moreover, the following operations are also allowed: detecting the overtaking state of the own vehicle MM, then determining that the overtaking state is established when the relative distance Dist between the own vehicle MM and the obstacle SM becomes a certain distance (in other words, time necessary for the relative distance Dist to become the certain distance has elapsed), and then suppressing the start of the obstacle approach prevention control.

(2) According to the first embodiment, the explanation has been made that, when the determination that the overtaking state is established is made and the lane change intention is detected (detecting that the lane change intention accuracy is high), the control start is suppressed. However, only the determination that the overtaking state is established may suppress the control start.

(3) Moreover, according to the first embodiment, when the determination that the overtaking state is established is made and the lane change intention is detected, the control start is suppressed. However, when it is determined, during the operation of the obstacle approach prevention control, that the overtaking state is established, suppressing of the control amount of the currently implemented control (that is, lowering the yaw moment Ms) is allowed, in place of suppressing of the control start.

(4) Moreover, according to the first embodiment, the explanation has been made that, based on the driver's operation, the change intention detector 8D detects whether or not the lane change intention is present. In place of this, whether or not the lane change intention is present may be detected based on the behavior of the vehicle.

That is, based on the behavior of the own vehicle MM, the change intention detector 8D detects whether or not the driver has the lane change intention.

The lane change intention is detected based on the behavior of the own vehicle. By this, when the driver unintentionally deviates the own vehicle MM from the lane, the obstacle approach prevention control is implemented, meanwhile when the driver intentionally change the lane, start of the uncomfortable obstacle approach prevention control can be suppressed.

For example, based on the change of yaw moment or change of acceleration which are caused to the own vehicle MM by the driver's steering operation, the change intention detector 8D may detect whether or not the driver has the lane change intention. The change of yaw moment or the change of acceleration can be detected, for example, by a differential value of the yaw movement or a differential value of the acceleration.

By this, the behavior of the own vehicle MM can detect the lane change intention.

(5) Otherwise, based on the own vehicle MM's movement relative to the white line 200 (lane marking), the change intention detector 8D may detect whether or not the driver has the lane change intention. The own vehicle MM's movement relative to the white line 200 is detected depending on, for example, the measure of the lateral speed, the measure of the yaw angle φf and the like.

The lane change intention is detected by the own vehicle MM's movement relative to the white line 200. As a result, when the driver implements the lane change based on the white line 200 which the driver regards as a practical lane, and when the own vehicle MM overtakes the obstacle SM, the start of the uncomfortable obstacle approach prevention control can be suppressed.

(6) Otherwise, based on the own vehicle MM's lateral speed relative to the obstacle SM, the change intention detector 8D may detect whether or not the driver has the lane change intention.

The lane change intention is detected by the own vehicle MM's movement relative to the obstacle SM. As a result, even the obstacle SM approaching from an adjacent lane is regarded as a target of the obstacle approach prevention control (alarm), and meanwhile, even when the lane change with respect to the above obstacle is made it is regarded that such lane change was implemented, thus implementing the obstacle approach prevention control. In this case, when the own vehicle MM has overtaken the obstacle SM, start of the uncomfortable obstacle approach prevention control can be suppressed.

(7) When the relative speed Relvsp is large, the relative distance Dist's determination threshold KD1 used for the overtaking state detector 8C to determine that the overtaking state is established may be smaller than when the relative speed Relvsp is small.

As the relative speed Relvsp is larger, detection that the own vehicle MM has overtaken the obstacle SM can be made in a position where the relative distance Dist is shorter. As a result, when the driver makes the lane change by adding the relative speed Relvsp at the merging and the like, control suppression in accordance with the driver's sense is allowed, thus making it possible to suppress the start of the uncomfortable control.

(8) The relative distance Dist's determination threshold KD1 used for the overtaking state detector 8C to determine that the overtaking state is established may be smaller as the detection angle Angle of the obstacle SM is disposed in a more rearward direction of the own vehicle MM with reference to the own vehicle MM's sideward direction.

When the detection angle Angle is disposed in a more rearward direction than the own vehicle MM's sideward direction, for example, when the obstacle SM is in such a position as to be shown in the rear view mirror of the own vehicle MM, it can determined that the overtaking state is established even if the relative distance Dist is small. As a result, the start of the uncomfortable control which does not accord with the driver's sense can be suppressed.

Second Embodiment

Then, the second embodiment will be set forth referring to drawings. Hereinafter, the same reference numerals or signs as those according to the first embodiment are added to the same devices and the like.

According to the first embodiment, the explanation was made about a case where the control start is suppressed by omitting the control.

Contrary to the first embodiment, the control start is suppressed by changing start conditions of control to thereby make it difficult to enter the control according to the second embodiment.

Herein, as stated above, the higher (more accurate) the lane change intention accuracy is, the smaller the lane change detection accuracy amount αL2 (αR2) is. The lane change intention accuracy is defined as an accuracy of the driver's intention of lane change. However, the lane change detection accuracy amount αL2 (αR2) multiplied by the overtaking detection accuracy amount αL1 (αL1) (for example, αL2←αL2×αL1) may be used as a total lane change intention accuracy.

Figure 9:
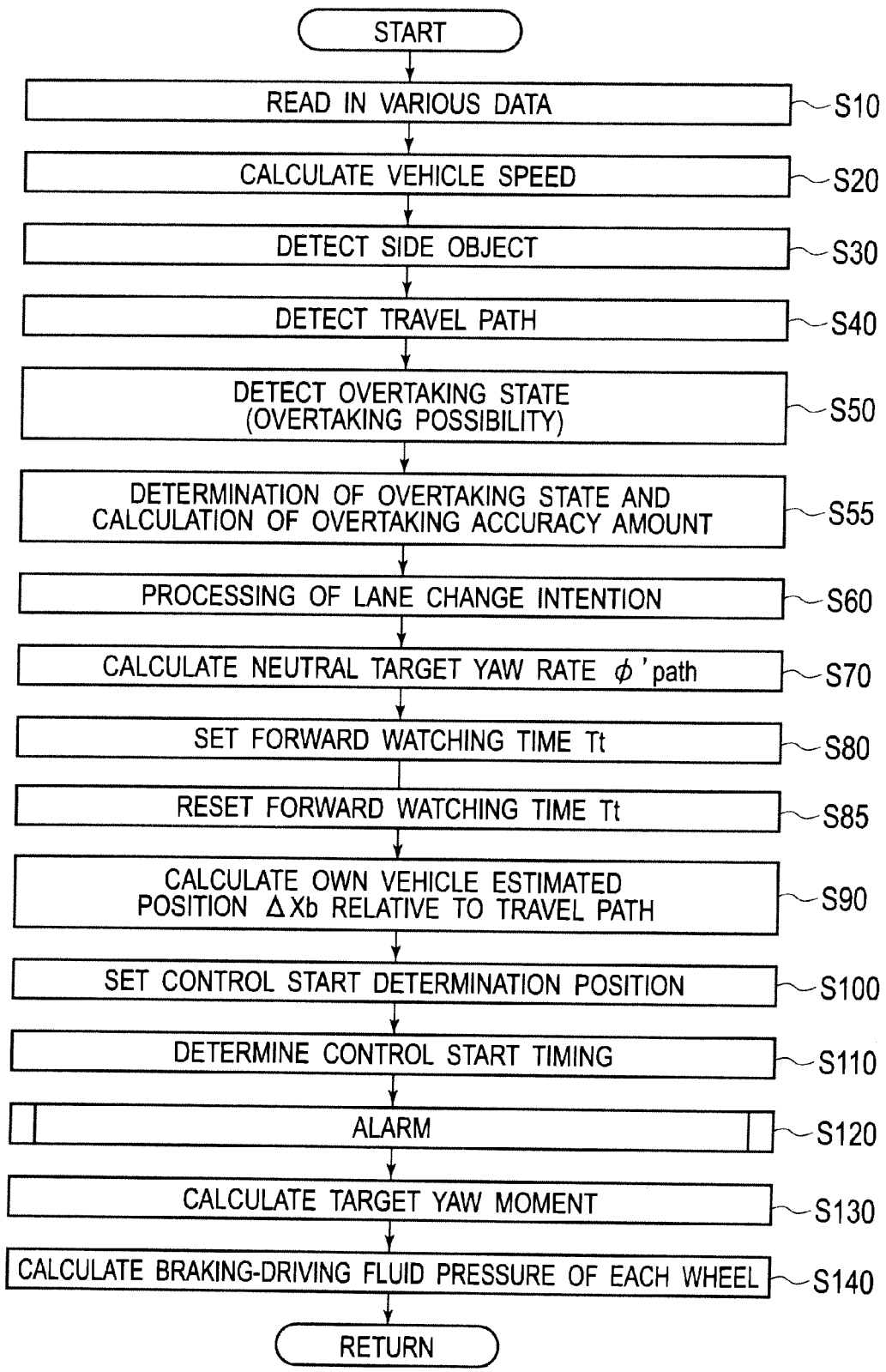
FIG. 9 is a flowchart showing the processing procedure of the control unit according to the second embodiment of the present invention.

FIG. 9 shows a flowchart showing the prevention control processing procedures implemented by the braking-driving force control unit 8 according to the second embodiment.

According to the second embodiment, as shown in FIG. 9, addition of step S85 replacing step S115 is different from FIG. 4. Other structures and processings are like those according to the first embodiment.

<Step S80>

At step S80, like the first embodiment, the forward watching time Tt for determining the threshold for estimating the state where the driver approaches the obstacle SM in the future is set.

<Step S85>

Then, at step S85, when the flag F_Overtake showing the determination of the overtaking state is "1," the forward watching time Tt is reset by the following expressions. The forward watching time Tt is thus reset smaller, as a result, the forward watching point 150 becomes smaller. On the other hand, when the flag F_Overtake is "0," the process moves to step S90.

$$Tt=Tt\times\alpha L2 \text{ (for left obstacle } SM\text{)}$$

$$Tt=Tt\times\alpha R2 \text{ (for right obstacle } SM\text{)}$$

Other structures and processings are like those according to the first embodiment.

(Operation)

When the driver makes the steering operation and the like to the obstacle SM side after overtaking the left obstacle SM, as shown in FIG. 7, it is determined whether or not the own vehicle estimated position ΔXb calculated by using the forward watching time Tt is more than or equal to ΔO. When ΔXb is more than or equal to ΔO, it is determined that the control start has been established. According to the second embodiment, since the forward watching time Tt is so reset as to be shorter, the control start is suppressed. That is, compared with when it is determined that non-overtaking state is established, the control is started when the own vehicle MM makes a more approach to the obstacle SM, thus the control is less likely to be started.

In this way, when it is determined that the own vehicle MM is in the state of overtaking the side obstacle SM, the start of the obstacle approach prevention control is suppressed, compared with when the determination that the overtaking state is established is not made. When the own vehicle MM is overtaking the side obstacle SM, it is conceived that the driver recognizes the side obstacle SM. Therefore, in such a case, suppressing the start of the obstacle approach prevention control can lower the driver's discomfort which is attributable to the following operations: the obstacle approach prevention control is sufficiently operated thereby the own vehicle MM is so controlled as to move away from the side obstacle SM.

Moreover, the higher the lane change intention accuracy is, the larger the control start suppression amount is made (i.e., the shorter the forward watching time Tt), thus making it possible to implement the driving assist control by further lowering the discomfort given to the driver.

Herein, steps S60, S85 are included in operations implemented by a change intention accuracy determiner 8Da. The forward watching time Tt is the certain time.

Effect of Second Embodiment (1) The change intention accuracy determiner 8Da (steps S60, S85) determines the lane change intention accuracy detected by the change intention detector 8D. When the lane change intention accuracy determined by the change intention accuracy determiner 8Da (steps S60, S85) is high, the suppressing of start by the control suppressor 8Ba is made stronger than when the lane change intention accuracy is low.

The stronger the lane change intention of the driver is, the stronger the suppressing of the control start is made. By this operation, for example, when the driver makes the lane change in a congestion where the distances to the forward and rearward vehicles are short, the uncomfortable control start can be suppressed when the driver intentionally makes the lane change.

(2) The lane change intention accuracy is determined based on the state of the direction indicator.

The detection accuracy of the lane change intention is detected by the state of the direction indicator, that is, the direction switch signal. By this, the driver explicitly shows the turn signal to thereby make it possible to detect early that the driver has a strong intention of overtaking and making lane change (lane change intention accuracy is high). As a result, the start of the uncomfortable control can be suppressed.

(3) The above lane change intention accuracy is determined based on the steering angle $\delta$ or steering angular speed D$\delta$.

The detection accuracy of the lane change intention is detected by the steering information. By this operation, when the driver, with a remarkable motion, overtakes the obstacle SM and makes the lane change, the start of the uncomfortable control can be suppressed.

(4) The above lane change intention accuracy is detected based on the vehicle acceleration state which is obtained from the driver's accelerator operation and the like.

When the driver makes the overtaking and lane change while accelerating the own vehicle MM for merging and the like, the start of the uncomfortable control can be suppressed.

(5) The obstacle approach prevention controller 8B determines the start of the obstacle approach prevention control based on the own vehicle future position (own vehicle estimated position $\Delta Xb$) estimated after the certain time (forward watching time Tt). The control suppressor 8Ba suppresses the start of the obstacle approach prevention control by shortening the certain time (forward watching time Tt).

Shortening the certain time (forward watching time Tt) for estimating the approach to the obstacle SM suppresses the control start, resulting in suppression of start of an unnecessary control, while making it possible to operate the control when the own vehicle MM comes close to the obstacle SM.

Third Embodiment

Then, the third embodiment will be set forth referring to drawings. Hereinafter, the same reference numerals or signs as those according to the first and second embodiments are added to the same devices and the like.

According to the third embodiment as well, the control start is suppressed by changing start conditions of control to thereby make it difficult to enter the control.

According to the second embodiment, at step S85, during the time when it is determined that the overtaking state is established, the forward watching time Tt is reset shorter. Contrary to this, according to the third embodiment, the determination threshold of the control start is reset to the obstacle SM side, to thereby suppress the control start.

That is, the determination threshold of the control start is so reset such that the control start threshold is delayed in accordance with the lane change intention accuracy of the driver. This reset is implemented only when the flag F_Overtake showing the determination of the overtaking state is 1.

Figure 10:
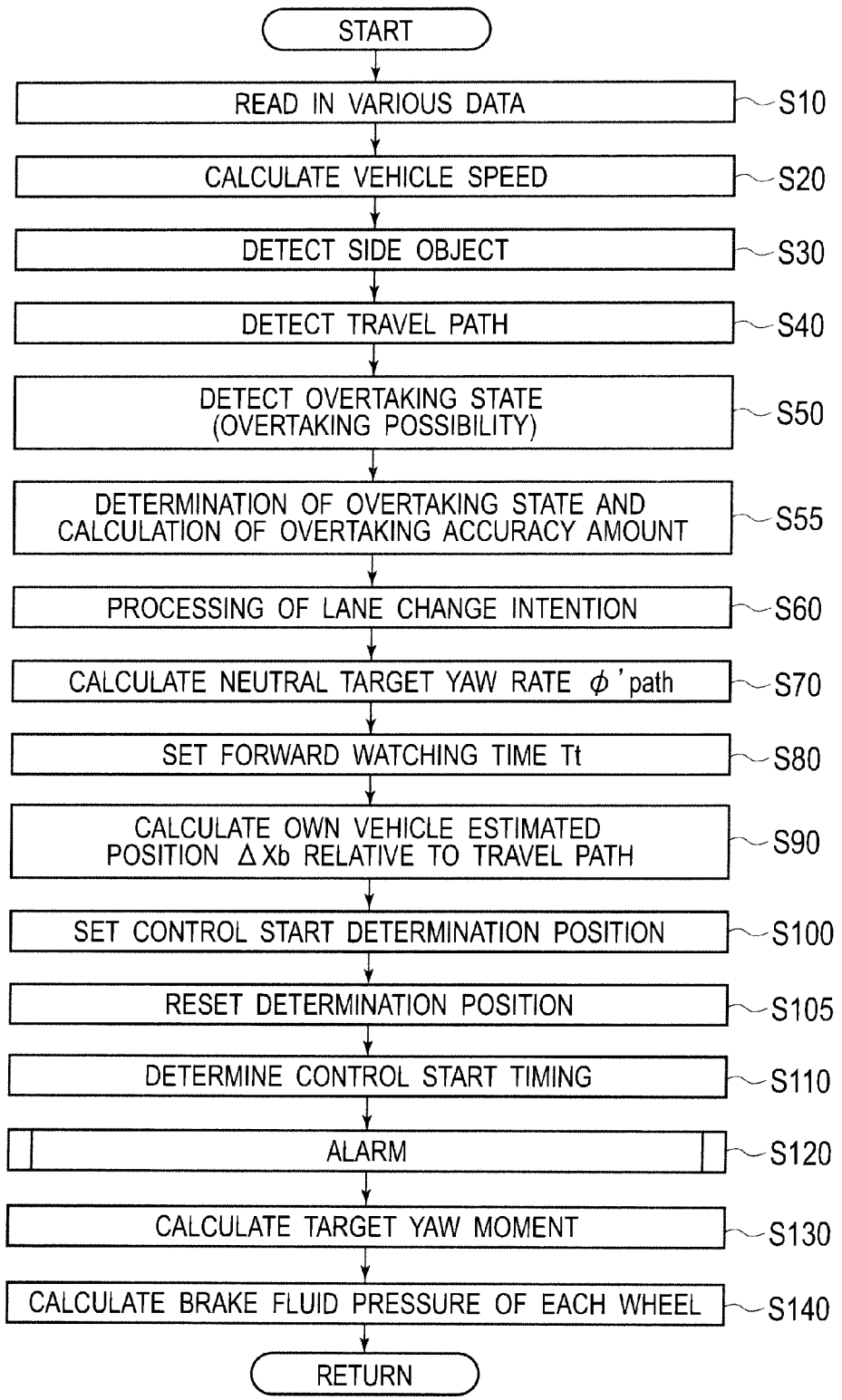
FIG. 10 is a flowchart showing the processing procedure of the control unit according to the third and fourth embodiments of the present invention.

FIG. 10 is a flowchart showing the prevention control processing procedures implemented by the braking-driving force control unit 8 according to the third embodiment.

In the processings shown in FIG. 10, addition of step S105 replacing step S115 (deleted) is different from FIG. 4.

That is, at step S105, when the flag F_Overtake showing the determination of the overtaking state is "1," the determination threshold for control start is reset to the obstacle SM side. On the other hand, when the flag F_Overtake is "0," the process moves to step S110.

Reset of the determination threshold for control start will be set forth.

Herein, as set forth at step S110 according to the first embodiment, when the start condition 1 is used, that is, with "$\Delta Xb \geq \Delta O$ ... (12)" as start condition, the determination threshold for control start is $\Delta O$. When the start condition 2 is used, that is, with "$\Delta X2=\Delta X-\Delta XO \geq X2obst$ ... (13)" as start condition, the determination threshold for control start is $X2obst$.

Contrary to this, when the flag F_Overtake is "1," the following processings are implemented to thereby reset the determination threshold.

At first, $\Delta XO$correction ($>1$) is calculated.

This $\Delta XO$correction is so set that the smaller the lane change detection accuracy amount $\alpha L2$ ($\alpha R2$) is the larger the $\Delta XO$correction is. Otherwise, $\Delta XO$correction may be constant.

Then, the determination threshold for control start is calculated based on the following expression.

(For start condition 1)

$$\Delta O \leftarrow \Delta O + \Delta XO\text{correction}$$

(For start condition 2)

$$X2obst \leftarrow X2obst + \Delta XO\text{correction}$$

Other structures are like those according to the first and second embodiments.

(Operation)

After the own vehicle MM overtakes the left obstacle SM, the driver implements the steering operation and the like toward the obstacle SM side (a in FIG. 8), then, as shown in FIG. 7, it is determined whether or not the own vehicle estimated position $\Delta Xb$ calculated by using the forward watching time Tt for control is more than or equal to $\Delta O$. When $\Delta Xb$ is more than or equal to ΔO, it is determined that the control start is established. In this case, according to the third embodiment, ΔO is set large, that is, the determination threshold for control start is reset to the obstacle SM side in the lane widthwise direction, thereby suppressing the control start. That is, compared with when it is determined that a non-overtaking state is established, the control is started when the own vehicle MM makes a more approach to the obstacle SM, thus the control is less likely to be started.

In this way, when it is determined that the own vehicle MM is in the state of overtaking the side obstacle SM, the start of the obstacle approach prevention control is suppressed, compared with when the determination that the overtaking state is established is not made. When the own vehicle MM is overtaking the side obstacle SM, it is conceived that the driver recognizes the side obstacle SM. Therefore, in such a case, suppressing the start of the obstacle approach prevention control can lower the driver's discomfort which is attributable to the following operations: the obstacle approach prevention control is sufficiently operated thereby the own vehicle MM is so controlled as to move away from the side obstacle SM.

Moreover, the higher the lane change intention accuracy is, the larger the control start suppression amount is made, thus making it possible to implement the driving assist control by further lowering the discomfort given to the driver.

Herein, step S105 is included in operations implemented by the change intention accuracy determiner 8Da.

Effect of Third Embodiment (1) The obstacle approach prevention controller 8B determines the start of the obstacle approach prevention control based on the obstacle SM or the control start position 60 which is set relative to the white line 200. The control suppressor 8Ba suppresses the start of the obstacle approach prevention control by changing setting of the control start position 60 to the obstacle SM side.

The control start threshold which was set with reference to the white line 200 is set to the inner side (obstacle SM side), to thereby suppress the control start. By this operation, the start of an unnecessary control is suppressed, while making it possible to operate the control when the own vehicle MM comes close to the obstacle SM.

Fourth Embodiment

Then, the fourth embodiment will be set forth referring to drawings. Hereinafter, the same reference numerals or signs as those according to the first to third embodiments are added to the same devices and the like.

According to the fourth embodiment as well, the control start is suppressed by changing start conditions of the control to thereby make it difficult to enter the control.

According to the second embodiment, at step S85, during the time when it is determined that the overtaking state is established, the forward watching time Tt is reset shorter. Contrary to this, according to the fourth embodiment, the obstacle detection area K-AREA is temporarily changed smaller to thereby suppress the control start.

The flowchart showing the prevention control processing procedures implemented by the braking-driving force control unit 8 according to the fourth embodiment is shown in FIG. 10 like the third embodiment.

However, the processing at step S105 according to the fourth embodiment is different from the processing at step S105 according to the third embodiment. Such different processings will be set forth.

At step S105 according to the fourth embodiment, when the flag F_Overtake showing the determination of the overtaking state is 0, the process moves to step S110. This operation is like that at step S105 according to the third embodiment. On the other hand, at step S105 according to the fourth embodiment, when the flag F_Overtake showing the determination of the overtaking state is 1, the following processings are implemented.

Figure 11:
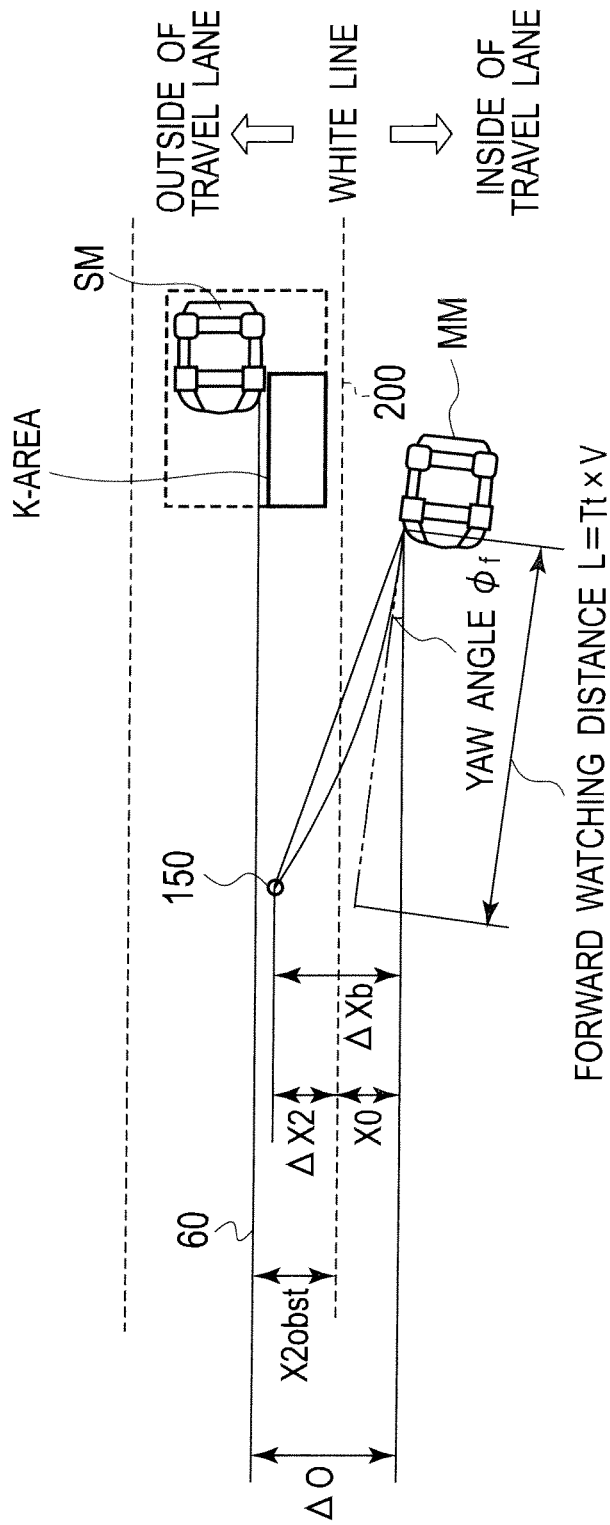
FIG. 11 is a conceptual diagram for explaining the fourth embodiment of the present invention.

That is, the obstacle detection area K-AREA for setting whether or not to detect the obstacle SM is changed by the following expression. FIG. 11 shows an example of the state after such a change.

Longitudinal range=Longitudinal range×$\alpha L2(\alpha R2)$

Lateral range=Lateral range×$\alpha L2(\alpha L2)$

A boundary position on the own vehicle MM side (longitudinal position and lateral position) in the obstacle detection area K-AREA is fixed, to thereby change the longitudinal width and lateral width in the detection range. That is, the range indicated by a broken line in FIG. 11 denotes the obstacle detection area K-AREA before the change while the range indicated by a solid line denotes the obstacle detection area K-AREA after the change.

Then, based on the detection signals of the radar devices 24L/24R, it is determined whether or not the obstacle SM is present in the thus changed obstacle detection area K-AREA. Determining that the obstacle SM is present in the changed obstacle detection area K-AREA, the process moves to step S110. On the other hand, determining that the obstacle SM is not present in the changed obstacle detection area K-AREA, the process ends the processings and returns.

Other structures are like those according to the first and second embodiments.

(Operation)

After the own vehicle MM overtakes the left obstacle SM, the driver implements the steering operation and the like toward the obstacle SM side, then, as shown in FIG. 11, it is determined whether or not the own vehicle estimated position ΔXb calculated by using the forward watching time Tt for control is more than or equal to ΔO. When ΔXb is more than or equal to ΔO, it is determined that the control start is established. In this case, according to the fourth embodiment, it is determined whether or not the obstacle SM is present in the obstacle detection area K-AREA which is corrected smaller. When the obstacle SM is not present, the control is not started. That is, compared with when it is determined that non-overtaking state is established, the control is started when the own vehicle MM makes a more approach to the obstacle SM.

In this way, when it is determined that the own vehicle MM is in the state of overtaking the side obstacle SM, the start of the obstacle approach prevention control is suppressed, compared with when the determination that the overtaking state is established is not made. When the own vehicle MM is overtaking the side obstacle SM, it is conceived that the driver recognizes the side obstacle SM. Therefore, in such a case, suppressing the start of the obstacle approach prevention control can lower the driver's discomfort which is attributable to the following operations: the obstacle approach prevention control is sufficiently operated thereby the own vehicle MM is so controlled as to move away from the side obstacle SM.

Moreover, the higher the lane change intention accuracy is, the larger the above control start suppression amount is made, thereby making it possible to implement the driving assist control by further lowering the discomfort given to the driver.

Herein, step S105 is included in operations implemented by the change intention accuracy determiner 8Da.

Effect of Fourth Embodiment (1) The control suppressor 8Ba suppresses the start of the obstacle approach prevention control by lessening the obstacle detection area K-AREA.

Lessening the obstacle detection area K-AREA for detecting the obstacle SM as control target suppresses the start of the obstacle approach prevention control. By this operation, the control can be operated when the own vehicle MM comes close to the obstacle SM, while suppressing the start of an unnecessary control.

Modified Example (1) At step S105, the obstacle detection area K-AREA for determining whether or not the obstacle is present was changed. In place of this, when the flag F_Overtake=1, an obstacle detection range itself of the radar devices 24L/24R may be changed for realization.

Fifth Embodiment

Then, the fifth embodiment will be set forth referring to drawings. Hereinafter, the same reference numerals or signs as those according to the first to fourth embodiments are added to the same devices and the like. According to the first to fourth embodiments, the control is suppressed by suppressing the start determination of the obstacle approach prevention control. However, according to the fifth embodiment, the control is suppressed by suppressing the control amount of the obstacle approach prevention control.

(Structure)

The image pickup portion 13 according to the fifth embodiment detects a merging state in the forward-and-sideward direction of the travel lane of the own vehicle MM. Specifically, based on the pickup image in the forward direction of the own vehicle MM, the image pickup portion 13 detects a distance Dist_lane from the own vehicle MM to the merging point 300.

That is, like the first embodiment, the image pickup portion 13 according to the fifth embodiment calculates the yaw angle $\phi f$, the lateral displacement Xf and the curvature $\beta$ of travel lane, and, based on the image in the forward direction of the own vehicle MM, detects that the lane on which the own vehicle MM is traveling merges with the adjacent lane. When detecting the merge, the image pickup portion 13 detects the distance Dist_lane from the own vehicle MM to the merging point 300 at which the own vehicle MM's lane merges with the adjacent lane. Herein, the detecting, based on the image in the forward direction of the own vehicle MM, that the travel lane of the own vehicle MM merges with the adjacent lane can be determined from the white line configuration (lane marker configuration) or sign of the merging point detected from the image in the forward direction of the own vehicle MM, and is a known art, therefore explanation of such known art is omitted. In addition, according to the fifth embodiment, from the image (in the forward direction of the own vehicle MM) taken by the image pickup portion 13, the merging (the own vehicle MM's travel lane with the adjacent lane) and the distance Dist_lane to the merging point 300 are detected, but not limited thereto. Otherwise, for example, the following operations are allowed: detecting the merging point 300 from, for example, the map information of the navigation system, and then detecting the distance Dist_lane to the merging point 300 based on the thus detected merging point 300 and on the own vehicle MM's position detected by a GPS (Global Positioning System).

Figure 12:
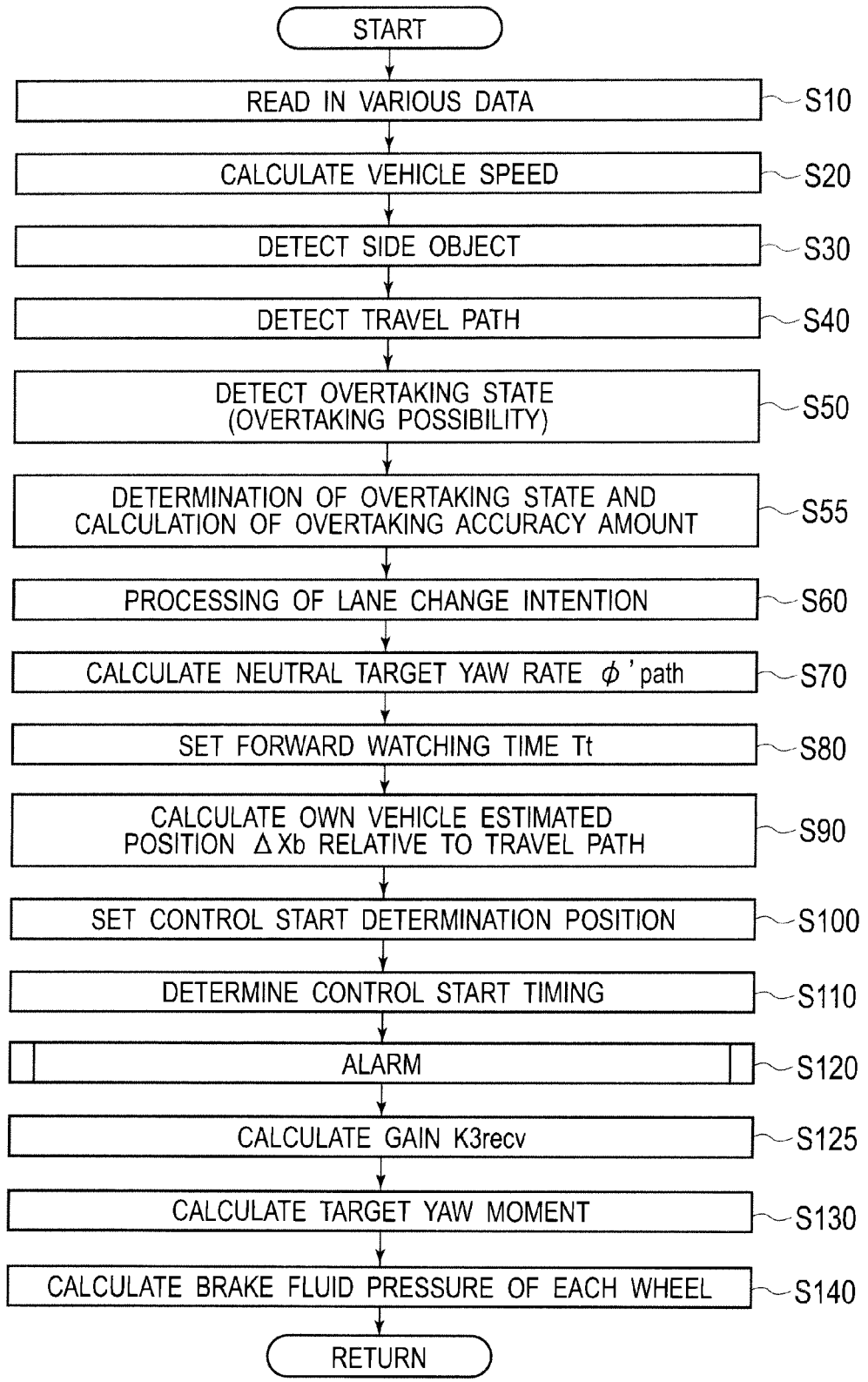
FIG. 12 is a flowchart showing the processing procedure of the control unit according to the fifth embodiment of the present invention.

FIG. 12 is a flowchart for setting forth processings according to the fifth embodiment. The flowchart in FIG. 12 omits the processing of step S115 in the flowchart (refer to FIG. 4) according to the first embodiment while adding thereto step S125. Other processings are like those according to the first embodiment, therefore, explanations thereof are omitted hereinafter.

At step S125, the braking-driving force control unit 8 calculates an after-described gain K3$recv$ ($\leq 1$) in accordance with the state that the own vehicle MM is overtaking the side obstacle SM. Herein, the gain K3$recv$ becomes smaller as the determination that the own vehicle MM is overtaking the side obstacle SM is made further (as the overtaking state accuracy is higher).

Figure 13:
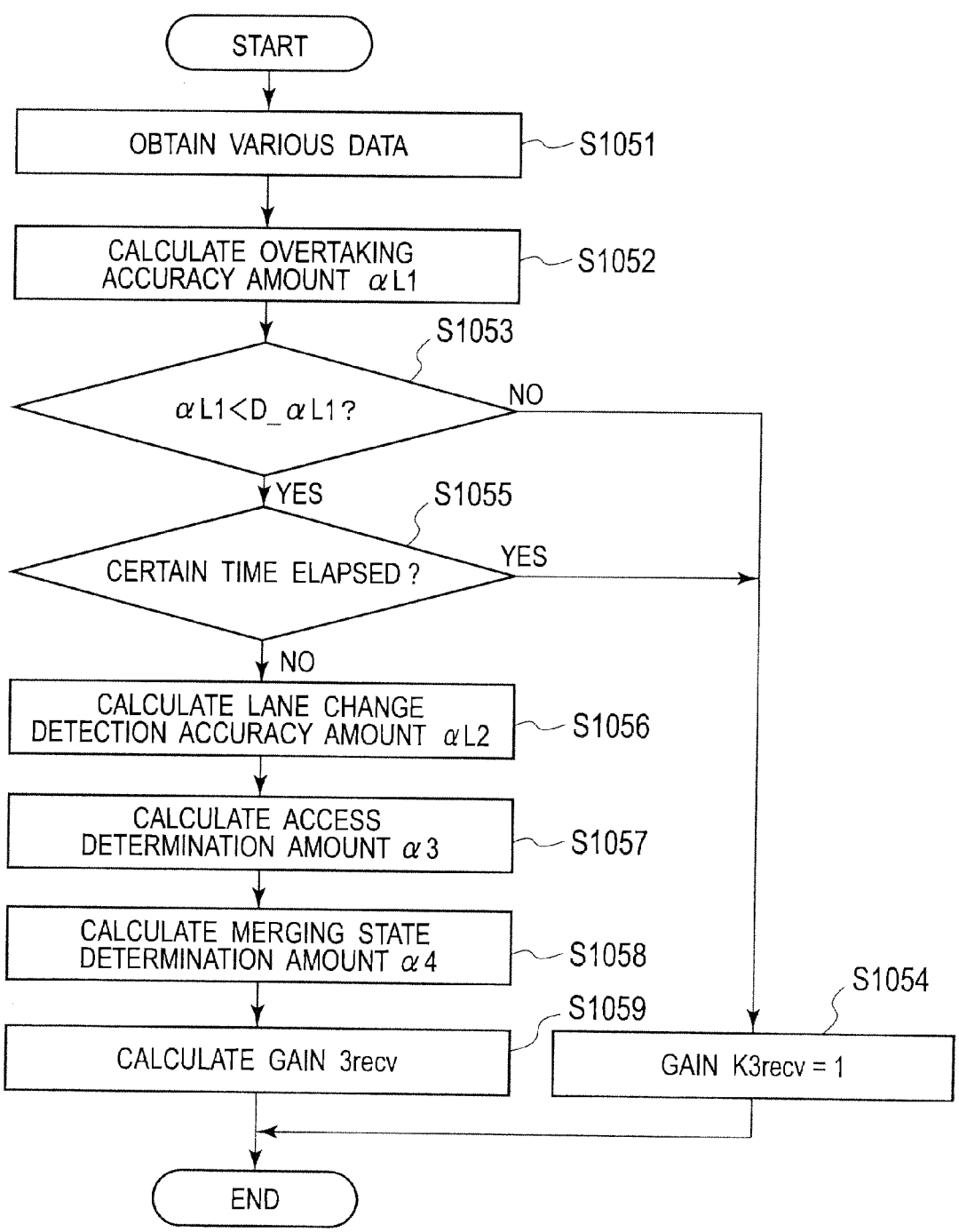
FIG. 13 is a flowchart showing the processing procedure of calculating a left gain.

Hereinafter, a method of calculating the gain K3$recv$ implemented at step S125 will be set forth. FIG. 13 is a flowchart showing calculation processing procedures of the gain K3$recv$ implemented at step S125.

<Step S1051>

At first, at step S1051, the braking-driving force control unit 8 acquires various data. Then, the process moves to step S1052. At step S1051, like at the step S10 in FIG. 4 set forth above, the braking-driving force control unit 8 acquires each wheel speed Vwi (i=fl, fr, rl, rr), the steering angle $\delta$, the accelerator opening $\theta t$, the master cylinder fluid pressure Pm, which are detected by each of the sensors including the wheel speed sensors 22FL, 22FR, 22LR, 22RR, the steering angle sensor 19, the accelerator opening sensor 18, and the master cylinder pressure sensor 17. Moreover, the braking-driving force control unit 8 acquires i) the direction switch signal of the direction indicator switch 20, ii) the yaw angle $\phi f$, lateral displacement Xf, curvature $\beta$ of the travel lane which are detected by the image pickup portion 13, and iii) the side obstacle SM's information detected by the radar devices 24L/24R (side obstacle detector 50). Other than the above, the braking-driving force control unit 8 acquires i) the information of the forward obstacle SM and ii) the merging state of the own vehicle travel lane.

Herein, the information of the forward obstacle SM includes the distance Dist_pre between the own vehicle MM and the forward obstacle SM and the relative speed Relvsp_pre between the own vehicle MM and the obstacle SM, which are detected by the radar device 23. Moreover, the merging state of the own vehicle travel lane is denoted by the distance Dist_lane from the own vehicle MM to the merging point 300 in the forward direction of the own vehicle MM.

<Step S1052>

At step S1052, the overtaking accuracy amount $\alpha L1$ is calculated by processings like those at step S55 in the flowchart in FIG. 4.

<Step S1053>

Then, at step S1053, like at step S55 in FIG. 4, the braking-driving force control unit 8 determines whether or not the overtaking accuracy amount $\alpha L1$ calculated at step S1052 is smaller than the overtaking detection threshold "D_$\alpha L1$ (<1)."

<Step S1054>

Then, when $\alpha L1 \geq D\_\alpha L1$, it is determined that the overtaking state is not established, and then the process moves to step S1054. With the gain K3$recv$=1, the calculation processing of the left gain K3$recv$ is ended.

<Step S1055>

On the other hand, when $\alpha L1 < D\_\alpha L1$ is determined at step S1053, it is determined that the overtaking state is established, and then the process moves to step S1055. Then, it is determined whether or not a certain time has elapsed after the overtaking state was detected (i.e., after $\alpha L1 \geq D\_\alpha L1$ changed to $\alpha L1 < D\_\alpha L1$).

Then, when the certain time has elapsed, the process moves to step S1054 above, while when the certain time has not elapsed, the process moves to step S1056.

<Step S1056>

At step S1056, based on the driver's operations acquired at step S1051, the braking-driving force control unit 8 calculates the left lane change detection accuracy amount $\alpha L2$ by processings like those at step S60 in the flowchart in FIG. 4 stated above.

<Step S1057>

Then, at step S1057, based on the information of the forward obstacle SM acquired at step S1051, the braking-driving force control unit 8 calculates an approach determination amount $\alpha 3$ to the forward obstacle SM.

As the information of the forward obstacle SM, the distance Dist_pre between the own vehicle MM and the obstacle SM and the relative speed Relvsp_pre between the own vehicle MM and the forward obstacle SM are used.

At first, based on the following expression (26), a reaching time (obstacle reaching time) TTC for the own vehicle MM to reach the forward obstacle SM is calculated.

$$TTC = Dist\_pre/Relvsp\_pre \qquad (26)$$

Then, the approach determination amount $\alpha 3$ is so calculated that the smaller the thus calculated obstacle reaching time TTC is, the smaller the approach determination amount $\alpha 3$ to the forward obstacle SM is.

<Step S1058>

Then, at step S1058, the braking-driving force control unit 8 calculates a merging state determination amount a4 based on the merging state (in the forward-and-sideward direction of the own vehicle travel lane) acquired at step S1051 above.

Figure 14:
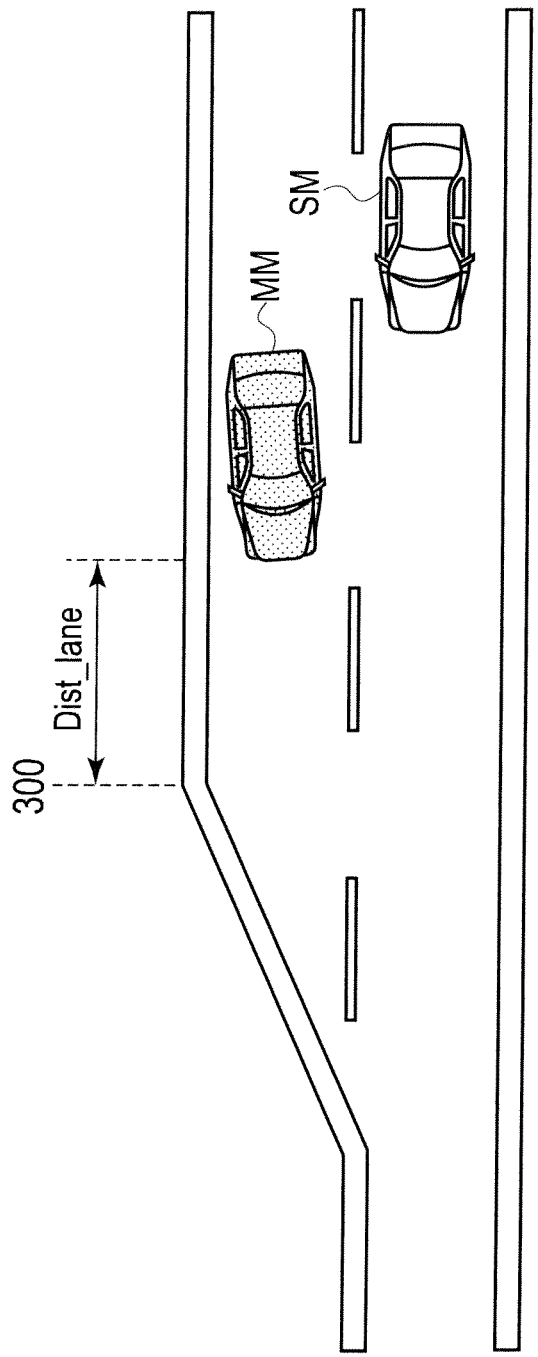
FIG. 14 is a diagram showing a merging point of the own vehicle travel lane.

As shown in FIG. 14, as the merging state in the forward-and-sideward direction of the own vehicle travel lane, the distance Dist_lane from the own vehicle MM to the merging point 300 is used.

At first, based on the distance Dist_lane to the merging point 300, the own vehicle speed V and the own vehicle acceleration dV, the reaching time (merging point reaching time) Tg for the own vehicle MM to reach the merging point 300 is calculated. Then, the merging state determination amount $\alpha 4$ is so calculated that the smaller the thus calculated merging point reaching time Tg is, the smaller the merging state determination amount $\alpha 4$ is.

<Step S1059>

Then, at step S1059, the braking-driving force control unit 8 calculates the left gain K3recv based on the overtaking accuracy amount $\alpha L1$ calculated at step S1052, the left lane change detection accuracy amount $\alpha L2$ calculated at step S1056, the approach determination amount $\alpha 3$ calculated at step S1057 and the merging state determination amount $\alpha 4$ calculated at step S1058.

$$K3recv = \alpha L1 \cdot \alpha L2 \cdot \alpha 3 \cdot \alpha 4 \qquad (27)$$

In addition, at step S125, a right gain K3recv is also calculated. The right gain K3recv is calculated based on the following expression (28).

$$K3recv = \alpha R1 \cdot \alpha R2 \cdot \alpha 3 \cdot \alpha 4 \qquad (28)$$

Based on the information of the right obstacle relative to the own vehicle MM, the right overtaking accuracy amount $\alpha R1$ is calculated by the procedure like that of the left overtaking accuracy amount $\alpha L1$ set forth above.

Based on the driver's driving operation, the lane change detection accuracy amount $\alpha R2$ in the direction of the right obstacle is calculated in by a procedure like that of the lane change detection accuracy amount $\alpha L2$ in the direction of the left obstacle. Moreover, the approach determination amount $\alpha 3$ to the forward obstacle SM and the merging state determination amount $\alpha 4$ use a common value on right and left sides.

In this way, the gain K3recv is calculated at step S125, and the process moves to step S130.

Then, at step S130, the braking-driving force control unit 8 sets the target yaw moment Ms.

When the obstacle approach prevention control determination flag Fout_obsts is OFF, the target yaw moment Ms is set to 0, and then the process moves to step S140.

On the other hand, when the obstacle approach prevention control determination flag Fout_obsts is ON, the target yaw moment Ms is calculated by the following expression (29), and then the process moves to step S140.

$$Ms = K1recv \cdot K2recv \cdot \Delta Xs \cdot K3recv \qquad (29)$$

$$\Delta Xs = (K1mon \cdot \phi f + K2mon \cdot \phi m)$$

Herein, K1recv, K2recv, K1mon and K2mon are gains which are set in a manner like that of the above expression (18).

According to the expression (29), as the steadily-caused yaw rate is made larger by the yaw angle $\phi f$ relative to the white line 200 or by the increased steering operation by the driver, the target yaw moment Ms becomes larger.

Other structures are like those according to the first and second embodiments.

(Operation)

Then, operations of the fifth embodiment will be set forth referring to FIG. 15.

Now, as shown in FIG. 15(a), it is assumed that the own vehicle MM is traveling in parallel with the left obstacle SM at substantially the same speed. In this case, the own vehicle MM is not in a state of overtaking the side obstacle SM, thus making the left overtaking accuracy amount $\alpha L1 \geq D\_\alpha L1$ (step S1053 in FIG. 13). Thus, the gain used for the left control becomes K3recv=1 (step S1054).

At first, based on the yaw angle $\phi f$, target yaw angular speed $\phi m$, target yaw angular acceleration $\phi m'$ which are acquired when the own vehicle MM is traveling, the own vehicle estimated position $\Delta Xb$ (refer to FIG. 7) is calculated as the own vehicle future position after the forward watching time Tt (step S90). Then, the own vehicle MM moves to the obstacle SM side by the driver's steering operation (a in FIG. 15(a)), thereby the own vehicle estimated position $\Delta Xb$ calculated by using the forward watching time (Tt·Kbuzz) for alarm becomes more than or equal to $\Delta O$, to thereby alarm the driver (step S120). Thereafter, when the driver fails to implement track amendments and the like of the own vehicle MM and the own vehicle estimated position $\Delta Xb$ calculated by using the forward watching time Tt for control becomes more than or equal to $\Delta O$, it is determined that the driving assist control for preventing the obstacle SM has started (step S110).

After the determination that the control is started is made, the target yaw moment Ms is calculated as control amount based on the own vehicle estimated position $\Delta Xb$ (step S130). In this case, since K3recv=1 as stated above, suppressing of the measure of the target yaw moment Ms is not implemented.

Then, the braking-driving force (brake fluid pressure) is so controlled as to cause the thus calculated target yaw moment Ms (step S140). By this operation, the own vehicle MM is controlled in a direction of preventing the approach to the obstacle SM (β1 in FIG. 15(a)).

Thus, when the driver makes the steering operation in a direction of approaching the side obstacle SM without recognizing the side obstacle SM, the own vehicle MM's approach to the side obstacle SM can be properly prevented.

On the other hand, as shown in FIG. 15(b), it is assumed that the own vehicle MM has overtaken the side obstacle SM at a speed higher than that of the side obstacle SM and then the driver makes a steering operation in a direction of approaching the side obstacle SM. In this case, it is determined that the own vehicle MM is in a state of overtaking the side obstacle SM, thus making the left overtaking accuracy amount αL1<D_αL1 (step S1053). Therefore, the gain for the left control becomes K3$recv$<1 (step S1059).

When the driver makes a steering operation toward the left obstacle SM side after overtaking the left obstacle SM (α in FIG. 15(b)), the own vehicle estimated position ΔXb calculated by using the forward watching time Tt for control becomes more than or equal to ΔO (refer to FIG. 7), thereby it is determined that the driving assist control has started. Then, based on the own vehicle estimated position ΔXb, the target yaw moment Ms is calculated (step S130). In this case, since K3$recv$<1 as stated above, the measure of the target yaw moment Ms (i.e., the control amount) is calculated smaller compared with when the own vehicle MM is not in the overtaking state in FIG. 15(a), even if the own vehicle estimated position ΔXb is the same. Thus, the obstacle access prevention control for preventing the access to the obstacle SM is suppressed (β2 in FIG. 15(b)).

In this way, when it is detected that the own vehicle MM is in a state of overtaking the side obstacle SM, the control amount of the obstacle approach prevention control is suppressed compared with when the overtaking state is not detected. When the own vehicle MM is overtaking the side obstacle SM, it is conceived that the driver recognizes the side obstacle SM. Therefore, in such a case, suppressing the control amount of the obstacle approach prevention control can lower the driver's discomfort which is attributable to the following operations: the obstacle approach prevention control is sufficiently operated thereby the own vehicle MM is so controlled as to move away from the side obstacle SM.

Moreover, the higher the accuracy of the overtaking state is (i.e., the smaller the left overtaking accuracy amount αL1 or the right overtaking accuracy amount αR1 is), the larger the suppression amount of the above control amount is made, thus making it possible to implement the driving assist control by further lowering the discomfort given to the driver.

Moreover, the higher the driver's steering intention accuracy is (i.e., the smaller the left lane change detection accuracy amount αL2 or the right lane change detection accuracy amount αR2 is) after the own vehicle MM overtook the side obstacle SM, the larger the suppression amount of the control amount of the obstacle approach prevention control is made, thus making it possible for the driver to implement the steering operation without discomfort.

Moreover, in a state where the possibility of the driver's steering intention is high after the own vehicle MM overtook the side obstacle SM, that is, in such cases as the own vehicle MM is approaching the forward obstacle SM or the merging point 300 is present in the forward direction of the vehicle's travel lane, the control amount of the obstacle approach prevention control is largely suppressed. Due to this, the discomfort given to the driver can be further lowered.

Herein, the radar device 23 is included in a forward obstacle detector. The image pickup portion 13 is included in a merging point detector. Step 1053 in FIG. 13 is included in the operations implemented by the overtaking state detector 8C and steps S1056 to S1059 are included in the operations implemented by the control suppressor 8Ba. Moreover, step S1057 is included in the operations implemented by an obstacle reaching time calculator and step S1058 is included in the operations implemented by a merging point reaching time calculator.

Effect of Fifth Embodiment (1) A side obstacle detector 50 detects an obstacle SM present in an obstacle detection area K-AREA, with at least a posterolateral direction of an own vehicle MM as the obstacle detection area K-AREA. An obstacle approach prevention controller 8B controls the own vehicle MM in such a manner as to prevent the own vehicle MM from approaching the obstacle SM. An overtaking state detector 8C detects, based on information of the obstacle SM with reference to the own vehicle MM, an overtaking state which is at least one of a first state where the own vehicle MM is overtaking the obstacle SM and a second state where the own vehicle MM is estimated to overtake the obstacle SM. A control suppressor 8Ba, when determination that the overtaking state is established is made based on the detection of the overtaking state detector 8C, suppresses control amount by the obstacle approach prevention controller 8B compared with when the determination that the overtaking state is established is not made.

In this way, when the state where the own vehicle MM is overtaking the side obstacle SM is detected, the control amount of the control for preventing the approach to the side obstacle SM is suppressed compared with when the state where the own vehicle MM is overtaking the side obstacle SM is not detected. Thus, when the driver implements the steering operation in a direction of approaching the side obstacle SM while recognizing the side obstacle SM, prevention of the own vehicle MM from approaching the side obstacle SM can be suppressed.

Thus, while the control operation causing discomfort to the driver is suppressed, the own vehicle MM's approach to the obstacle SM can be properly prevented.

(2) The change intention detector 8D detects the driver's lane change intention (the driver's driving operation in a direction for approaching the side obstacle SM). When the change intention detector 8D detects, during the certain time, the driving operation in the direction for approaching the side obstacle SM after the overtaking state detector 8C detects the overtaking state, the control suppressor 8Ba enlarges the suppression amount of the control amount of the obstacle approach prevention control.

In this way, when the operation for approaching in the direction of the side obstacle SM (lane change intention in the direction of the obstacle SM) is detected after the own vehicle MM overtook the side obstacle SM, the suppression amount of the obstacle approach prevention control is corrected to be large. Thus, the driver's discomfort can be effectively lowered.

(3) The forward obstacle detector (radar device 23) detects the obstacle SM present in a forward direction of the own vehicle MM. The obstacle reaching time calculator (step S1057) calculates an obstacle reaching time TTC for the own vehicle MM to reach the forward obstacle SM detected by the forward obstacle detector (radar device 23). The shorter the obstacle reaching time TTC calculated by the obstacle reaching time calculator (step S1057) is, the larger the suppression amount of the control amount of the obstacle approach prevention control is set by the control suppressor 8Ba.

Thus, in a situation that the operation for approaching in the direction of the side obstacle SM is estimated after the own vehicle MM overtook the side obstacle SM, the suppression amount of the obstacle approach prevention control can be corrected to be large. Thus, the driver's discomfort can be effectively lowered.

(4) A merging point detector (image pickup portion 13) detects a merging point 300 in a forward-and-sideward direction of a travel lane of the own vehicle MM. A merging point reaching time calculator (S1058) calculates a merging point reaching time Tg for the own vehicle MM to reach the merging point 300 detected by the merging point detector (image pickup portion 13). The shorter the merging point reaching time Tg calculated by the merging point reaching time calculator (S1058) is, the larger the suppression amount of the control amount of the obstacle approach prevention control is set by the control suppressor 8Ba.

Thus, in a situation that the operation for approaching in the direction of the side obstacle SM is estimated after the own vehicle MM overtook the side obstacle SM, the suppression amount of the obstacle approach prevention control can be corrected to be large. Thus, the driver's discomfort can be effectively lowered.

(5) When the side obstacle SM in the sideward direction of the own vehicle MM is detected, the obstacle approach prevention control for assisting the driver's operation such that the own vehicle MM is prevented from approaching the side obstacle SM is implemented. In this case, when the overtaking state where the own vehicle MM is overtaking the side obstacle SM is detected based on the information of the side obstacle SM with reference to at least the own vehicle MM, the control amount of the obstacle approach prevention control is suppressed compared with when the overtaking state is not detected.

Thus, while the uncomfortable control operation which may be felt by the driver when the driver makes a steering operation while recognizing the side obstacle SM, the own vehicle MM's approach to the obstacle SM can be properly prevented.

Modified Example (1) According to the fifth embodiment, at step S1053 in FIG. 13, the explanation has been made in such a case that, when the overtaking state of the own vehicle MM is detected, the control amount of the obstacle approach prevention control is suppressed. Otherwise, after the overtaking state of the own vehicle MM is detected, suppressing of the control amount of the obstacle approach prevention control may be continued for a certain time. Moreover, during the certain time, the control amount of the obstacle approach prevention control may be suppressed until the own vehicle MM makes a certain distance travel (i.e., until a time necessary for the certain distance travel elapses).

Moreover, after the overtaking state of the own vehicle MM was detected, during the certain time, the control amount of the obstacle approach prevention control may be suppressed until the relative distance Dist between the own vehicle MM and the side obstacle SM becomes the certain distance (until a time necessary for the relative distance Dist to become the certain distance elapses).

(2) According to the fifth embodiment, the explanation has been made about such a case that the suppression amount of the control amount of the obstacle approach prevention control is set according to detection/estimation results (of the steering for an approach to the side obstacle SM) which are obtained after the overtaking state of the own vehicle MM was detected. However, the above suppression amount may be set at least according to the detection result of the overtaking state of the own vehicle MM. That is, in the processings in FIG. 13, the following equations are allowed: $\alpha L2 (\alpha R2)=1$, $\alpha 3=1$, and $\alpha 4=1$. In this case, when the overtaking state of the own vehicle MM is simply detected, the control amount of the obstacle approach prevention control is suppressed according to the accuracy of the overtaking state. By this operation, a simple structure can suppress the control operations having discomfort which may be caused when the driver makes the steering operation while recognizing the side obstacle SM.

(3) According to the fifth embodiment, the explanation has been made about such a case that the suppression amount of the control amount of the obstacle approach prevention control is set when the overtaking state of the own vehicle MM is detected (when a positive determination is made at step S1053 in FIG. 13). However, the suppression amount of the control amount of the obstacle approach prevention control may be set only when the overtaking state of the own vehicle MM is detected and the driver of the own vehicle MM has a steering intention. That is, the following operations are allowed: when the overtaking state of the own vehicle MM is detected, whether or not the lane change detection accuracy amount $\alpha L2 (\alpha R2)$ is less than or equal to a certain threshold is determined, and when the lane change detection accuracy amount $\alpha L2 (\alpha R2)$ is less than or equal to the certain threshold, it is determined that the driver has a lane change intention to thereby set the suppression amount of the control amount of the obstacle approach prevention control.

(4) Moreover, the method of determining that the driver has the lane change intention is not limited to the above stated method of making the determination based on the lane change detection accuracy amount $\alpha L2 (\alpha R2)$. Otherwise, for example, as stated according to the first embodiment, the vehicle behavior, the own vehicle MM's movement relative to the white line 200 (lane marker), the own vehicle MM's lateral speed relative to the obstacle SM, and the like may be used for the determination.

In addition, according to the first to fourth embodiments, suppressing the determination of the control start when the own vehicle MM overtakes the other vehicle SM suppresses the obstacle approach prevention control, and according to the fifth embodiment, suppressing the control amount (target yaw moment Ms) when the own vehicle MM overtakes the other vehicle SM suppresses the obstacle approach prevention control. The present invention is, however, not limited to the above. That is, when the own vehicle MM overtakes the other vehicle SM, both the suppressing of the determination of the control start and the suppressing of the control amount are allowed.

In this case, the degree of freedom for implementing the suppressing of control is enhanced.

The entire contents of the basic Japanese Patent Application Laid-Open No. 2009-167049 (filed Jul. 15, 2009 in Japan), Japanese Patent Application Laid-Open No. 2009-292704 (filed Dec. 24, 2009 in Japan) and Japanese Patent Application Laid-Open No. 2010-135077 (filed Jun. 14, 2010 in Japan) are incorporated herein by reference, in order to protect this application from erroneous translations or omitted portions.

As stated above, the content of the present invention has been set forth according to the first to fifth embodiments as well as their modified examples. The present invention is, however, not limited to the above descriptions. It is obvious to those skilled in the art that various modifications and improvements thereof are allowed.

INDUSTRIAL APPLICABILITY

When the driver's own vehicle approaches the obstacle to thereby satisfy the start condition of the obstacle approach prevention control in a situation where it can be determined that the driver's own vehicle is in a state of overtaking the obstacle or in a state estimated to overtake the obstacle, it is assumed that the driver has an intention of making a lane change to the obstacle side while recognizing the presence of the obstacle. Under the present invention, in such a case, the obstacle approach prevention control is suppressed, as a result, making it possible to suppress the discomfort of the driver. That is, while lowering the discomfort given to the driver, the present invention can properly implement the driving assist control with respect to the obstacle positioned in the posterolateral direction of the own vehicle.

The invention claimed is:

1. A driving assisting system for a vehicle, the driving assisting system comprising:
    a side obstacle detector configured to detect an obstacle present in an obstacle detection area, wherein the obstacle detection area includes at least a posterolateral direction of the vehicle;
    an obstacle approach prevention controller configured to implement an obstacle approach prevention control which assists an approach prevention for preventing the vehicle from approaching an obstacle detected by the side obstacle detector;
    an overtaking state detector configured to detect an overtaking state which is at least one of a first state where the vehicle is overtaking, in a vehicle forward direction, the obstacle detected by the side obstacle detector and a second state where the vehicle is estimated to overtake, in a vehicle forward direction, the obstacle, wherein the overtaking state detector is configured to detect the overtaking state based at least on (i) a distance between the vehicle and the obstacle, (ii) a speed of the vehicle relative to the obstacle, and (iii) a detection angle of the obstacle relative to the vehicle;
    a control suppressor configured to suppress the obstacle approach prevention control when a determination that the overtaking state is established is made based on the detecting by the overtaking state detector compared with when the determination that the overtaking state is established is not made; and
    a future position estimator configured to estimate a future position which is a position of the vehicle after a certain time,
    wherein the obstacle approach prevention controller is configured to determine a start of the obstacle approach prevention control based on the future position estimated by the future position estimator, and
    wherein the control suppressor is configured such that, when the determination that the overtaking state is established is made based on the detecting by the overtaking state detector, the control suppressor suppresses the start of the obstacle approach prevention control by the obstacle approach prevention controller compared with when the determination that the overtaking state is established is not made, to thereby suppress the obstacle approach prevention control.

2. The vehicle driving assistant according to claim 1, wherein the control suppressor is configured to suppress the start of the obstacle approach prevention control by lessening the obstacle detection area.

3. The vehicle driving assistant according to claim 1, wherein:
    the obstacle approach prevention controller is configured to determine that the start of the obstacle approach prevention control is established, when the future position of the vehicle after the certain time estimated by the future position estimator is outside the obstacle or outside a control start position in a lane widthwise direction, where the control start position is set at a certain distance from a lane marker, and
    the control suppressor is configured such that, when the determination that the overtaking state is established is made based on the detecting by the overtaking state detector, the control suppressor changes the control start position to the obstacle side, to thereby suppress the start of the obstacle approach prevention control.

4. The vehicle driving assistant according to claim 1, wherein the control suppressor is configured to suppress the start of the obstacle approach prevention control by shortening the certain time used by the future position estimator to estimate the future position.

5. The vehicle driving assistant according to claim 1, wherein:
    the obstacle approach prevention controller is configured to control the vehicle in such a manner as to prevent an approach of the vehicle to the obstacle,
    the control suppressor is configured such that, when the determination that the overtaking state is established is made based on the detecting by the overtaking state detector, the control suppressor suppresses a control amount by the obstacle approach prevention controller compared with when the determination that the overtaking state is established is not made, to thereby suppress the obstacle approach prevention control,
    the vehicle driving assistant further comprises:
        a forward obstacle detector configured to detect the obstacle present in a forward direction of the vehicle, and
        an obstacle reaching time calculator configured to calculate an obstacle reaching time for the vehicle to reach the forward obstacle detected by the forward obstacle detector,
    the control suppressor is configured such that, as the obstacle reaching time calculated by the obstacle reaching time calculator is shorter, the control suppressor sets larger a suppression amount of the control amount of the obstacle approach prevention control, and
    the future position is a forward watching point which is a vehicle future position after a forward watching time, and the obstacle reaching time is a time for reaching the forward watching point.

6. The vehicle driving assistant according to claim 1, wherein:
    the obstacle approach prevention controller is configured to control the vehicle in such a manner as to prevent an approach of the vehicle to the obstacle,
    the control suppressor is configured such that, when the determination that the overtaking state is established is made based on the detecting by the overtaking state detector, the control suppressor suppresses a control amount by the obstacle approach prevention controller compared with when the determination that the overtaking state is established is not made, to thereby suppress the obstacle approach prevention control, the vehicle driving assistant further comprises:
- a merging point detector configured to detect a merging point in a forward direction of a travel lane of the vehicle, and
- a merging point reaching time calculator configured to calculate a merging point reaching time for the vehicle to reach the merging point detected by the merging point detector, and the control suppressor is configured such that, as the merging point reaching time calculated by the merging point reaching time calculator is shorter, the control suppressor sets larger a suppression amount of the control amount of the obstacle approach prevention control, and the future position is the merging point in the forward direction.

7. The vehicle driving assistant according to claim 1, further comprising:
- a future position estimator configured to estimate a future position which is a position of the vehicle after a certain time,
- wherein the obstacle approach prevention controller is configured to determine a start of the obstacle approach prevention control based on the future position of the vehicle after the certain time estimated by the future position estimator, and
- wherein the control suppressor is configured such that, when the determination that the overtaking state is established is made based on the detecting by the overtaking state detector, the control suppressor suppresses the start of the obstacle approach prevention control by the obstacle approach prevention controller and also suppresses a control amount by the obstacle approach prevention controller compared with when the determination that the overtaking state is established is not made, to thereby suppress the obstacle approach prevention control.

8. The vehicle driving assistant according to claim 1, further comprising:
- a change intention detector configured to detect whether or not a driver has a lane change intention,
- wherein the control suppressor is configured such that, when the determination that the overtaking state is established is made based on the detecting by the overtaking state detector and the lane change intention is detected by the change intention detector, the control suppressor suppresses the obstacle approach prevention control.

9. The vehicle driving assistant according to claim 8 wherein the change intention detector is configured to detect whether or not the lane change intention is present based on a change of a yaw moment or a change of an acceleration which are caused to the vehicle.

10. The vehicle driving assistant according to claim 8 wherein-the change intention detector is configured to detect whether or not the lane change intention is present based on a movement of the vehicle relative to a lane marker.

11. The vehicle driving assistant according to claim 8 wherein the change intention detector detects whether or not the lane change intention is present based on a relative speed in a lateral direction of the vehicle relative to the obstacle.

12. The vehicle driving assistant according to claim 1, further comprising:
- a change intention accuracy determiner configured to determine a lane change intention accuracy of a driver,
- wherein the control suppressor is configured such that, when the lane change intention accuracy determined by the change intention accuracy determiner is high, the suppressing by the control suppressor is made stronger than when the lane change intention accuracy is low.

13. The vehicle driving assistant according to claim 12, wherein the lane change intention accuracy is determined at least one of a state of a direction indicator, a steering angle, a steering angular speed, and an acceleration operation of the driver.

14. The vehicle driving assistant according to claim 1, wherein the obstacle approach prevention control by the obstacle approach prevention controller is configured to implement at least one of (i) causing to the vehicle a yaw moment in a direction away from the obstacle, and (ii) alerting the driver that the own vehicle is approaching the obstacle.

15. A driving assisting system for a vehicle, the driving assisting system comprising:
- a side obstacle detector configured to detect an obstacle present in an obstacle detection area, wherein the obstacle detection area includes at least a posterolateral direction of the vehicle;
- an obstacle approach prevention controller configured to implement an obstacle approach prevention control which assists an approach prevention for preventing the vehicle from approaching an obstacle detected by the side obstacle detector;
- an overtaking state detector configured to detect an overtaking state which is at least one of a first state where the vehicle is overtaking the obstacle detected by the side obstacle detector and a second state where the vehicle is estimated to overtake the obstacle;
- a control suppressor configured to suppress the obstacle approach prevention control when a determination that the overtaking state is established is made based on the detecting by the overtaking state detector compared with when the determination that the overtaking state is established is not made; and
- a future position estimator configured to estimate a future position which is a position of the vehicle after a certain time,
- wherein the obstacle approach prevention controller is configured to determine a start of the obstacle approach prevention control based on the future position estimated by the future position estimator,
- wherein the control suppressor is configured such that, when the determination that the overtaking state is established is made based on the detecting by the overtaking state detector, the control suppressor suppresses the start of the obstacle approach prevention control by the obstacle approach prevention controller compared with when the determination that the overtaking state is established is not made, to thereby suppress the obstacle approach prevention control, and
- wherein the control suppressor is configured to suppress the start of the obstacle approach prevention control by lessening the obstacle detection area.

16. A driving assisting system for a vehicle, the driving assisting system comprising:
- a side obstacle detector configured to detect an obstacle present in an obstacle detection area, wherein the obstacle detection area includes at least a posterolateral direction of the vehicle;
- an obstacle approach prevention controller configured to implement an obstacle approach prevention control which assists an approach prevention for preventing the vehicle from approaching an obstacle detected by the side obstacle detector;

an overtaking state detector configured to detect an overtaking state which is at least one of a first state where the vehicle is overtaking the obstacle detected by the side obstacle detector and a second state where the vehicle is estimated to overtake the obstacle;

a control suppressor configured to suppress the obstacle approach prevention control when a determination that the overtaking state is established is made based on the detecting by the overtaking state detector compared with when the determination that the overtaking state is established is not made; and a future position estimator configured to estimate a future position which is a position of the vehicle after a certain time, wherein the obstacle approach prevention controller is configured to determine a start of the obstacle approach prevention control based on the future position estimated by the future position estimator, wherein the control suppressor is configured such that, when the determination that the overtaking state is established is made based on the detecting by the overtaking state detector, the control suppressor suppresses the start of the obstacle approach prevention control by the obstacle approach prevention controller compared with when the determination that the overtaking state is established is not made, to thereby suppress the obstacle approach prevention control, wherein the obstacle approach prevention controller is configured to determine that the start of the obstacle approach prevention control is established, when the future position of the vehicle after the certain time estimated by the future position estimator is outside the obstacle or outside a control start position in a lane widthwise direction, where the control start position is set at a certain distance from a lane marker, and wherein the control suppressor is configured such that, when the determination that the overtaking state is established is made based on the detecting by the overtaking state detector, the control suppressor changes the control start position to the obstacle side, to thereby suppress the start of the obstacle approach prevention control.

17. A driving assisting system for a vehicle, the driving assisting system comprising:

a side obstacle detector configured to detect an obstacle present in an obstacle detection area, wherein the obstacle detection area includes at least a posterolateral direction of the vehicle;

an obstacle approach prevention controller configured to implement an obstacle approach prevention control which assists an approach prevention for preventing the vehicle from approaching an obstacle detected by the side obstacle detector;

an overtaking state detector configured to detect an overtaking state which is at least one of a first state where the vehicle is overtaking the obstacle detected by the side obstacle detector and a second state where the vehicle is estimated to overtake the obstacle;

a control suppressor configured to suppress the obstacle approach prevention control when a determination that the overtaking state is established is made based on the detecting by the overtaking state detector compared with when the determination that the overtaking state is established is not made; and a future position estimator configured to estimate a future position which is a position of the vehicle after a certain time, wherein the obstacle approach prevention controller is configured to determine a start of the obstacle approach prevention control based on the future position estimated by the future position estimator, wherein the control suppressor is configured such that, when the determination that the overtaking state is established is made based on the detecting by the overtaking state detector, the control suppressor suppresses the start of the obstacle approach prevention control by the obstacle approach prevention controller compared with when the determination that the overtaking state is established is not made, to thereby suppress the obstacle approach prevention control, and wherein the control suppressor is configured to suppress the start of the obstacle approach prevention control by shortening the certain time used by the future position estimator to estimate the future position.

\* \* \* \* \*